United States Patent
Rastegardoost et al.

(10) Patent No.: US 11,483,859 B2
(45) Date of Patent: Oct. 25, 2022

(54) RANDOM ACCESS PROCEDURES USING REPETITION

(71) Applicant: Comcast Cable Communications, LLC, Philadelphia, PA (US)

(72) Inventors: Nazanin Rastegardoost, McLean, VA (US); Esmael Dinan, McLean, VA (US); Hyoungsuk Jeon, Centreville, VA (US); Yunjung Yi, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/993,546

(22) Filed: Aug. 14, 2020

(65) Prior Publication Data

US 2021/0051707 A1 Feb. 18, 2021

Related U.S. Application Data

(60) Provisional application No. 62/888,069, filed on Aug. 16, 2019.

(51) Int. Cl.
*H04W 74/00* (2009.01)
*H04W 72/14* (2009.01)
(Continued)

(52) U.S. Cl.
CPC ........ *H04W 74/006* (2013.01); *H04B 17/318* (2015.01); *H04L 5/0051* (2013.01);
(Continued)

(58) Field of Classification Search
None
See application file for complete search history.

(56) References Cited

U.S. PATENT DOCUMENTS

2010/0074130 A1* 3/2010 Bertrand ........... H04W 28/0221
370/252
2016/0270038 A1* 9/2016 Papasakellariou ...... H04L 5/005
(Continued)

FOREIGN PATENT DOCUMENTS

GB 2544317 A 5/2017
KR 20200054086 A 5/2020
(Continued)

OTHER PUBLICATIONS

Interdigital Inc: "Discussion on Procedures for Two-Step RACH", 3GPP Draft; R1-1904850 Discussion On Procedures for Twostep RACH, 3rd Generation Partnership Project (3GPP), Mobile Competence Centre ; 650, Route Des Lucioiles ; F-06921 Sophia-Antipolis Cedex; Fran, vol. RAN WG1, No. Xi'an, China; Apr. 8, 2019-Apr. 12, 2019 Mar. 30, 2019 (Mar. 30, 2019).
(Continued)

*Primary Examiner* — Peter Chen
*Assistant Examiner* — Jeff Banthrongsack
(74) *Attorney, Agent, or Firm* — Banner & Witcoff, Ltd.

(57) ABSTRACT

Wireless communications may be used for repetition of one or more transmissions. At least some wireless devices may use and/or require different quantities of repetitions of one or more transmissions based on one or more factors such as received signal strength and/or other channel condition(s). The quantity of repetitions may be less than or equal to a maximum quantity of repetitions that may be indicated by a base station.

17 Claims, 27 Drawing Sheets

(51) Int. Cl.
  *H04W 74/08* (2009.01)
  *H04L 5/00* (2006.01)
  *H04B 17/318* (2015.01)
  *H04L 5/10* (2006.01)
(52) U.S. Cl.
  CPC .............. *H04L 5/10* (2013.01); *H04W 72/14* (2013.01); *H04W 74/0833* (2013.01)

(56) References Cited

U.S. PATENT DOCUMENTS

2018/0324716 A1* 11/2018 Jeon ................. H04W 52/367
2019/0132882 A1   5/2019 Li et al.
2020/0092777 A1   3/2020 Agiwal et al.

FOREIGN PATENT DOCUMENTS

| WO | 2018031620 A1 | 2/2018 |
| WO | 2020032745 A1 | 2/2020 |
| WO | 2020033660 A1 | 2/2020 |
| WO | 2020060371 A1 | 3/2020 |
| WO | 2020076953 A1 | 4/2020 |
| WO | 2020167794 A1 | 8/2020 |

OTHER PUBLICATIONS

Dec. 9, 2020—European Search Report—EP 20191064.3.
3GPP TS 36.321 V15.4.0 (Dec. 2018), Technical Specification, 3rd Generation Partnership Project; Technical Specification Group Radio Access Network; Evolved Universal Terrestrial Radio Access (E-UTRA); Medium Access Control (MAC) protocol specification (Release 15).
3GPP TS 36.331 V15.4.0 (Dec. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 15).
3GPP TSG RAN WG1 Meeting #96bis, Xi'an, China, Apr. 8-12, 2019, Title: RAN1 Chairman's Notes.
R1-1905793 3GPP TSG RAN WG1 Meeting #96bis, Xi'an, China, Apr. 8-12, 2019, Source: ZTE, Title: Updated summary of 7.2.1.1 Channel Structure for Two-step RACH.
3GPP TS 38.212 V15.6.0 (Jun. 2019), 3rd Generation Partnership Project; Technical Specification Group Radio Access Network; NR; Multiplexing and channel coding (Release 15).
3GPP TS 38.213 V15.6.0 (Jun. 2019), Technical Specification, 3rd Generation Partnership Project; Technical Specification Group Radio Access Network; NR; Physical layer procedures for control (Release 15).
3GPP TS 38.214 V15.6.0 (Jun. 2019), Technical Specification, 3rd Generation Partnership Project; Technical Specification Group Radio Access Network; NR; Physical layer procedures for data (Release 15).
3GPP TS 38.321 V15.6.0 (Jun. 2019), Technical Specification, 3rd Generation Partnership Project; Technical Specification Group Radio Access Network; NR; Medium Access Control (MAC) protocol specification (Release 15).
3GPP TS 38.331 V15.6.0 (Jun. 2019), Technical Specification, 3rd Generation Partnership Project; Technical Specification Group Radio Access Network; NR; Radio Resource Control (RRC) protocol specification (Release 15).
3GPP TSG RAN WG1 Meeting #97, Reno, USA, May 13-17, 2019, Title: RAN1 Chairman's Notes.
R1-1905989 3GPP TSG RAN WG1 Meeting #97, Reno, USA, May 13-17, 2019, Source: ZTE, Sanechips, Title: Further discussions on the channel structure of msgA.
R1-1905990 3GPP TSG RAN WG1 Meeting #97, Reno, USA, May 13-17, 2019, Source: ZTE, Sanechips, Title: Further discussions on 2-step RACH procedures.
R1-1906050 3GPP TSG RAN WG1 Meeting #97, Reno, USA, May 13-17, 2019, Source: Huawei, HiSilicon, Title: Discussion on channel structure of 2-step RACH.
R1-1906124 3GPP TSG RAN WG1 Meeting #97, Reno, USA, May 13-17, 2019, Source: vivo, Title: Discussion on channel structure of 2-step RACH.
R1-1906192 3GPP TSG RAN WG1 #97, Reno, USA, May 13-17, 2019, Source: NTT DOCOMO, Inc., Title: Discussion on Channel Structure of Two-Step RACH.
R1-1906366 3GPP TSG RAN WG1 Meeting #97, Reno, USA, May 13-17, 2019, Source: Spreadtrum communications Title: Considerations on the channel structure of 2-step RACH.
R1-1906747 3GPP TSG RAN WG1 #97, Reno, USA, May 13-17, 2019, Source: Nokia, Nokia Shanghai Bell, Title: On 2-step RACH Procedure.
R1-1906779 3GPP TSG RAN WG1 #97, Reno, USA, May 13-17, 2019, Source: Intel Corporation, Title: Discussion on channel structure for 2-step RACH.
R1-1906858 3GPP TSG RAN WG1 Meeting #97, Reno, USA, May 13-17, 2019, Source: InterDigital Inc. Title: On preamble and PUSCH mapping.
R1-1907196 3GPP TSG RAN WG1 Meeting #97, Reno, USA, May 13-17, 2019, Source: CAICT, Title: Considerations on Channel Structure for Two-step RACH.
R1-1907255 3GPP TSG RAN WG1 Meeting #97, Reno, USA, May 13-17, 2019, Source: Qualcomm Incorporated, Title: Channel Structure for Two-step RACH.
R1-1907256 3GPP TSG RAN WG1 Meeting #97, Reno, USA, May 13-17, 2019, Source: Qualcomm Incorporated, Title: Procedures for Two-step RACH.
R1-1907830 3GPP TSG RAN WG1 #97, Reno, USA, May 13-17, 2019, Source: ZTE, Title: Feature Lead Summary #2 of 7.2.1.1 Two-step RACH Channel Structure.
3GPP TSG RAN WG2 Meeting #105bis, Xi'an, China, Apr. 8-12, 2019, Source: RAN2 Chairman (Intel), Title: Chair notes.
3GPP TSG RAN WG2 Meeting #106, Reno, USA, May 13-17, 2019, Source: RAN2 Chairman (Intel), Title: Chair notes.
RP-190xxx 3GPP TSG RAN Meeting #84, Newport Beach, USA, Jun. 3-6, 2019, Source: ZTW Corporation, Title: Status Report to TSG.

* cited by examiner

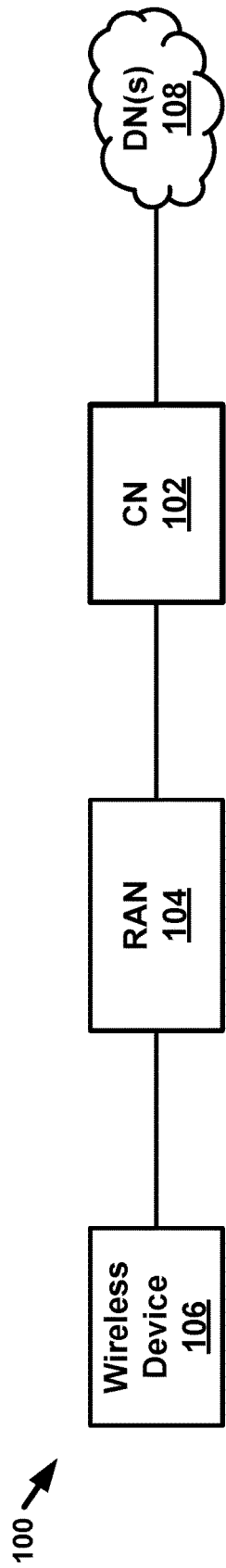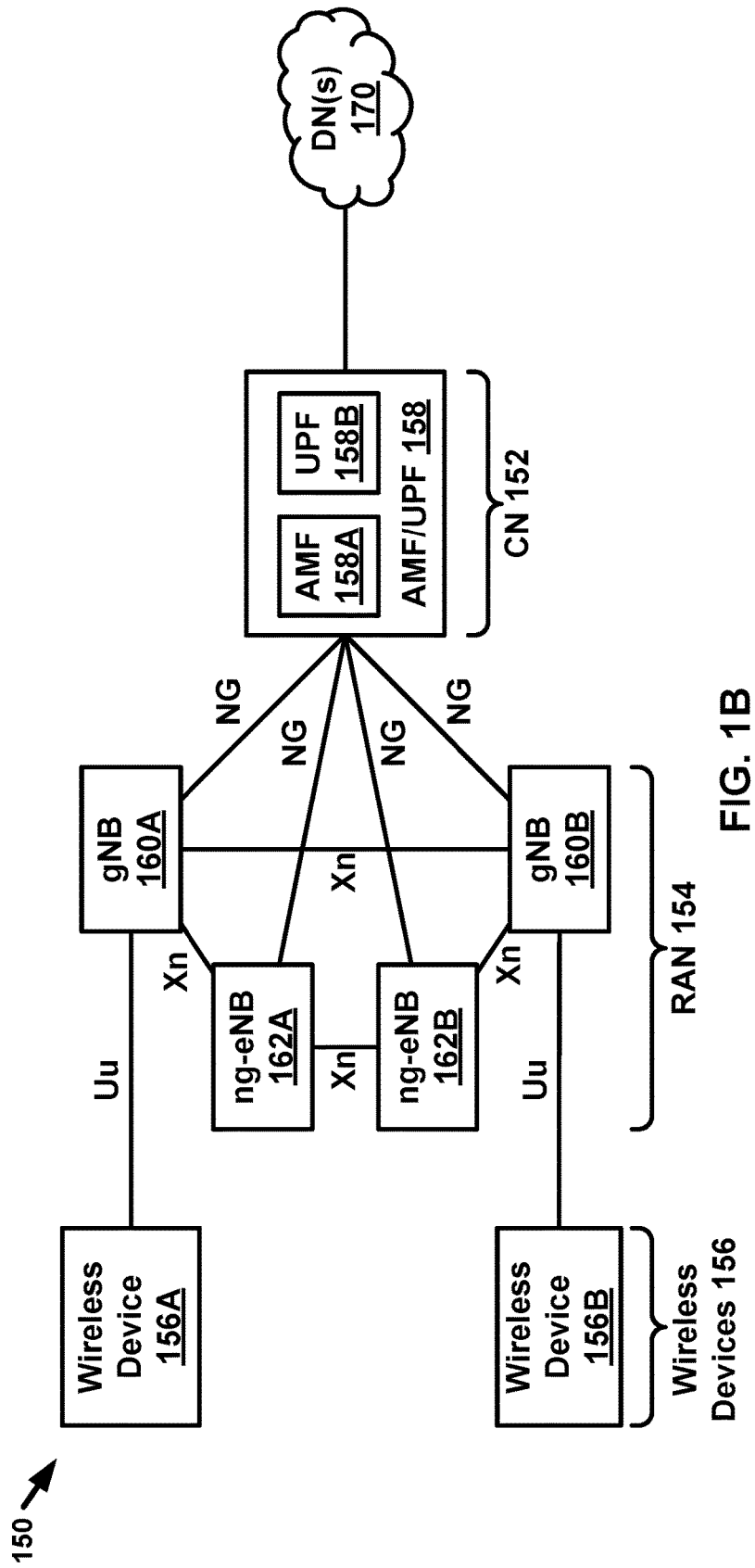

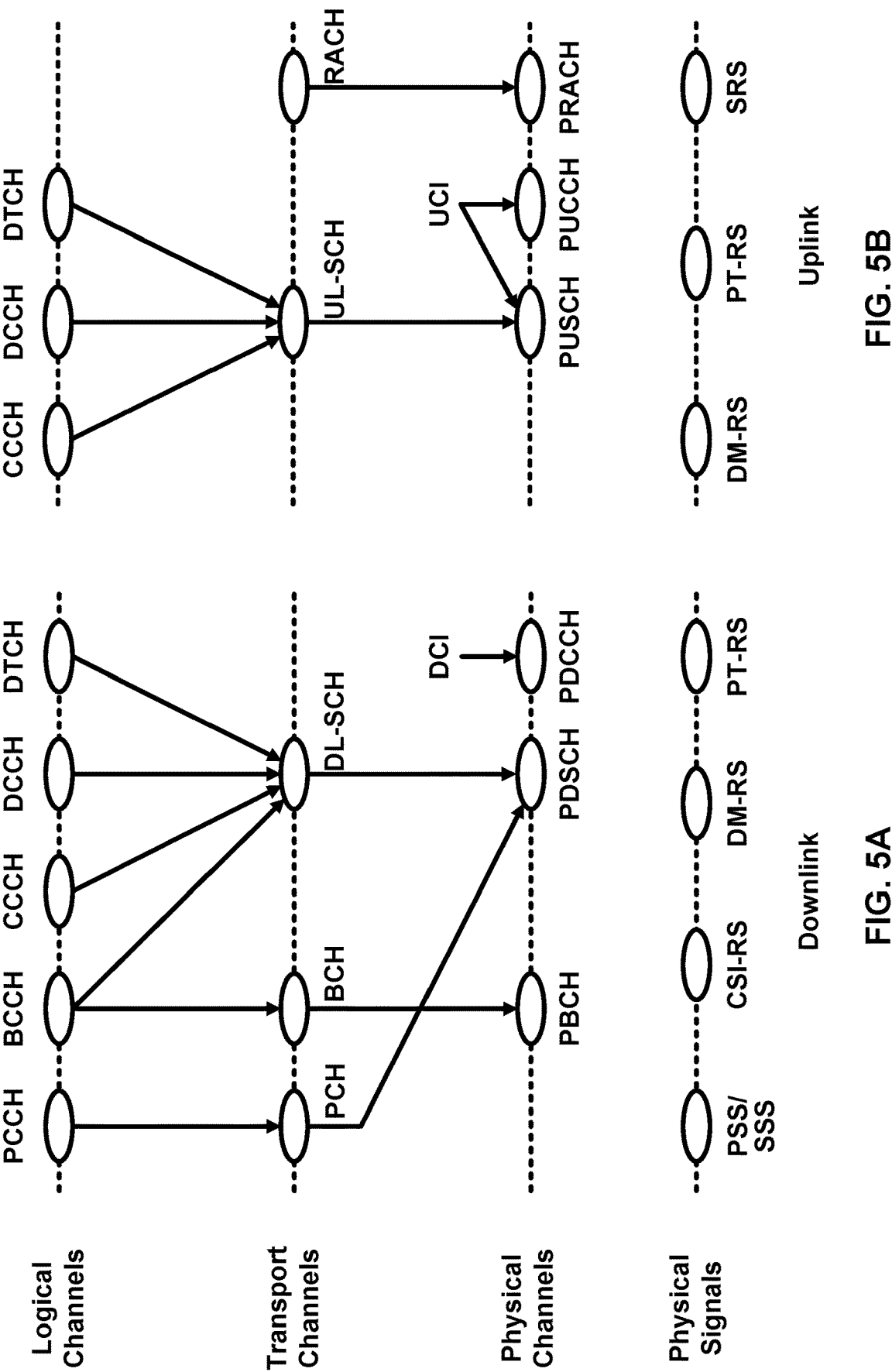

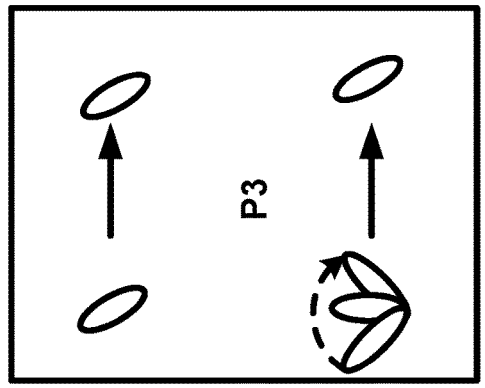
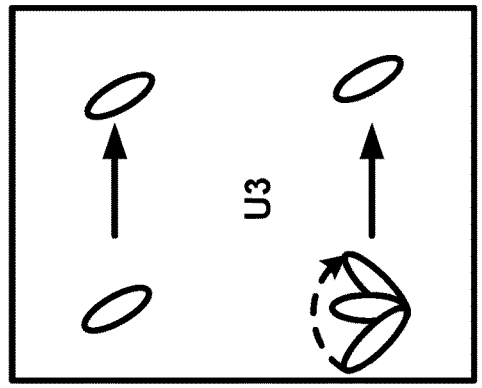
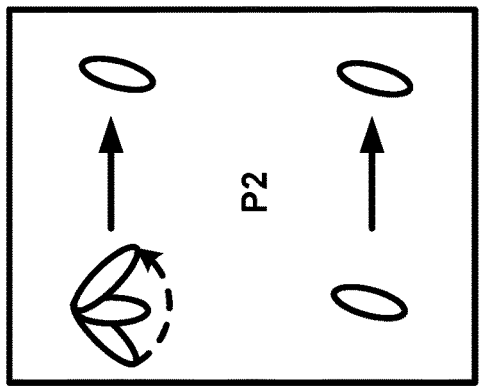
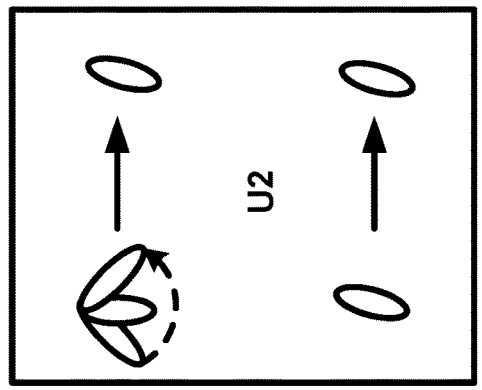
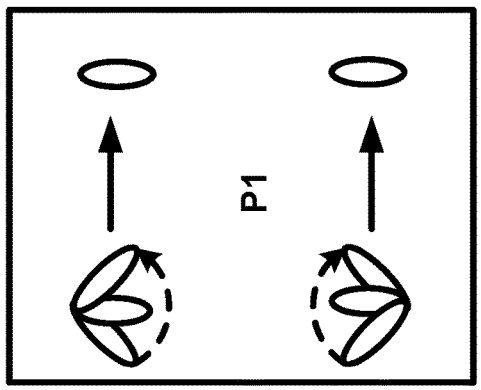
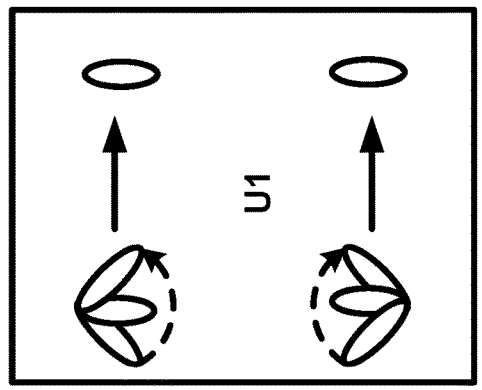
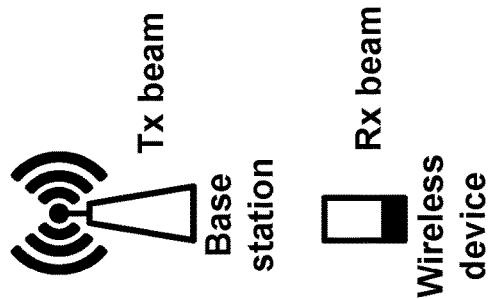
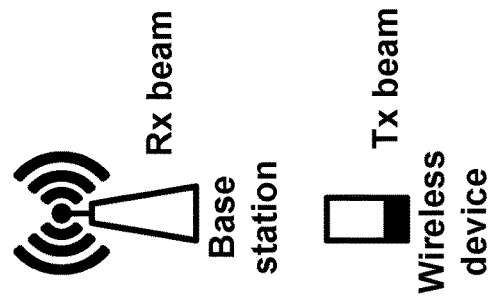
FIG. 12A
FIG. 12B

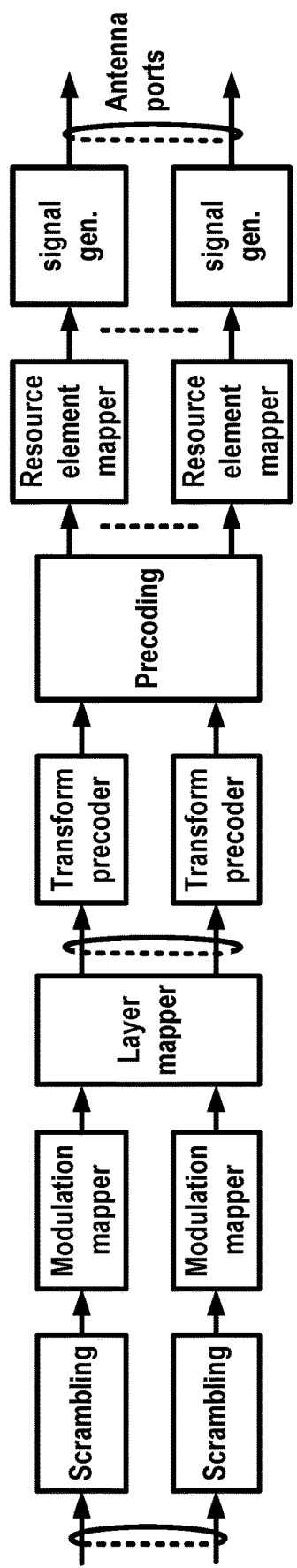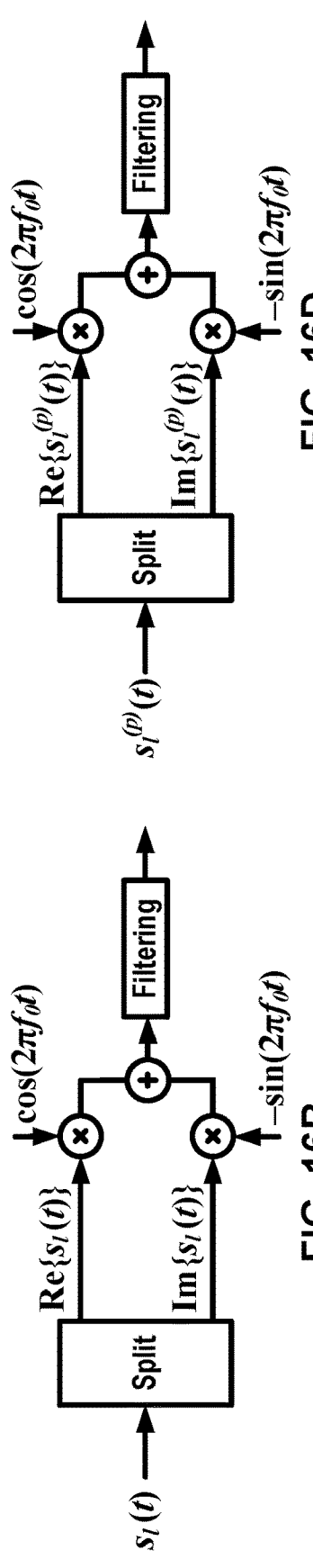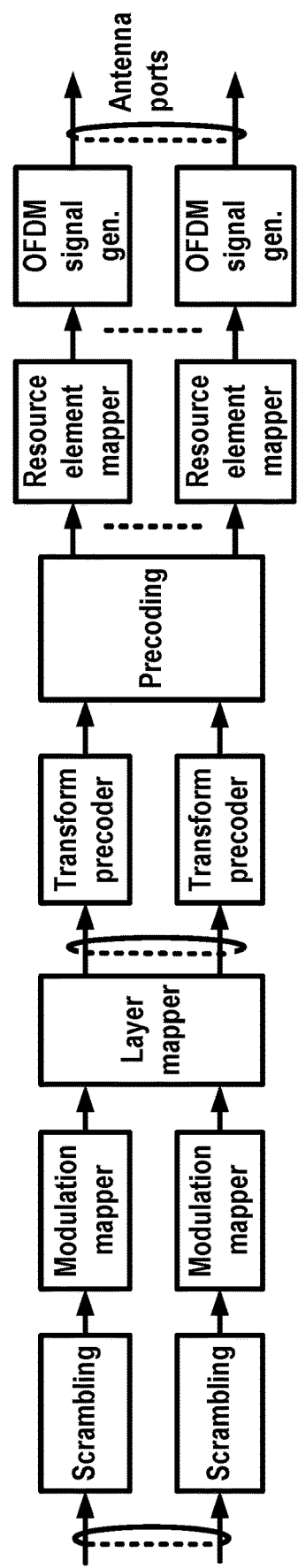
FIG. 16A
FIG. 16B
FIG. 16C
FIG. 16D

Slots
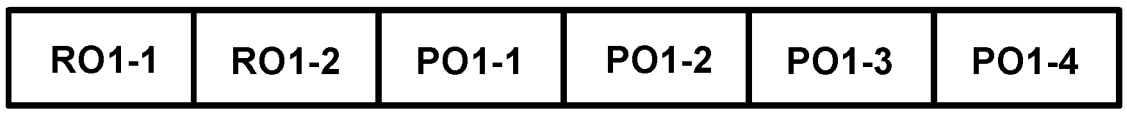
FIG. 21A
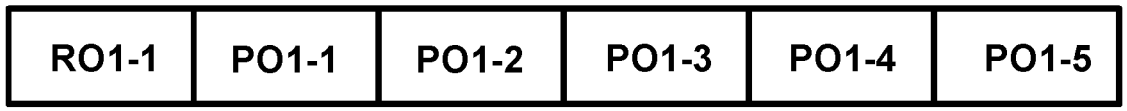
FIG. 21B
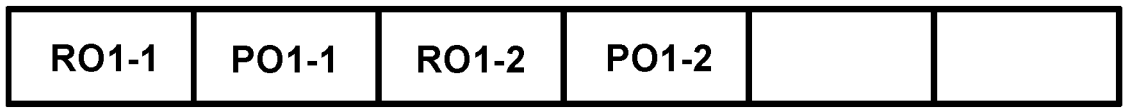
FIG. 21C

| RSRP | K |
|---|---|
| [RSRP_1,RSRP_2] | K1 |
| (RSRP_2,RSRP_3] | K2 |
| . . . | . . . |
| . . . | . . . |
| (RSRP_K-1, RSRP_K] | R |

RANDOM ACCESS PROCEDURES USING REPETITION

CROSS-REFERENCE TO RELATED APPLICATIONS

This application claims the benefit of U.S. Provisional Application No. 62/888,069 filed on Aug. 16, 2019. The above-referenced application is hereby incorporated by reference in its entirety.

BACKGROUND

A wireless device communicates with a base station. The wireless device may send repetitions of a transmission to the base station.

SUMMARY

The following summary presents a simplified summary of certain features. The summary is not an extensive overview and is not intended to identify key or critical elements.

Wireless communications may comprise repetition of one or more transmissions. Repetitions may be used for various transmissions, such as for random access, data, control information, feedback, and/or any other transmission. A base station may communicate with a plurality of wireless devices, at least one of which (e.g., each of which) may send repetitions of one or more transmissions to the base station. The repetitions may be used, for example, to increase a likelihood of successful reception of the transmissions. At least one wireless device may use and/or require different quantities of repetitions (e.g., relative to other wireless device(s)), based on one or more factors such as received signal strength and/or other condition(s). The quantity of repetitions of one or more transmissions may be less than or equal to a maximum quantity of repetitions that may be indicated by the base station. Examples described herein may provide advantages such as more efficient power consumption, increased reliability of wireless communications, and/or reduced transmission latencies.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 16A, FIG. 16B, FIG. 16C, and FIG. 16D show examples of uplink and downlink signal transmission.

FIG. 21A, FIG. 21B, and FIG. 21C show examples of resource allocation for a message using a repetition.

DETAILED DESCRIPTION

Figure 2A:
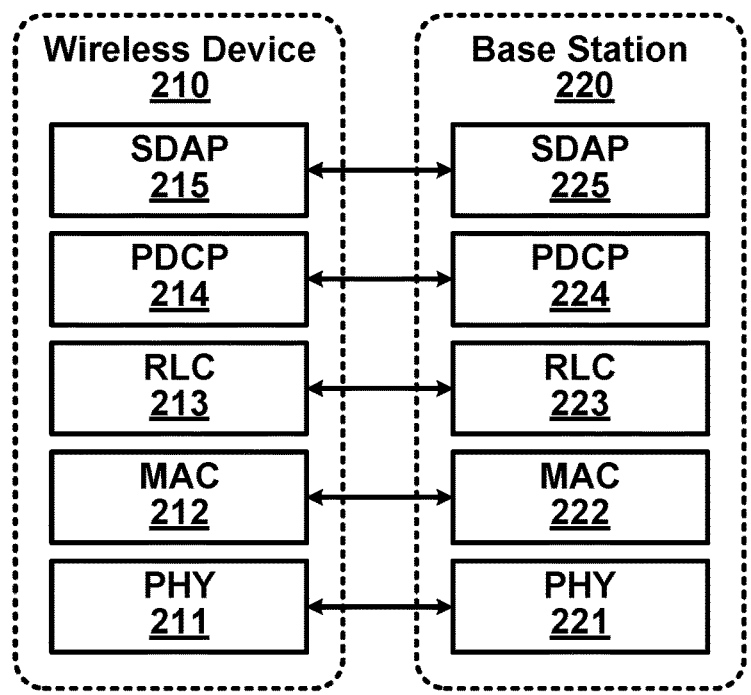
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to processing of downlink channels and uplink channels.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise, for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage.

Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
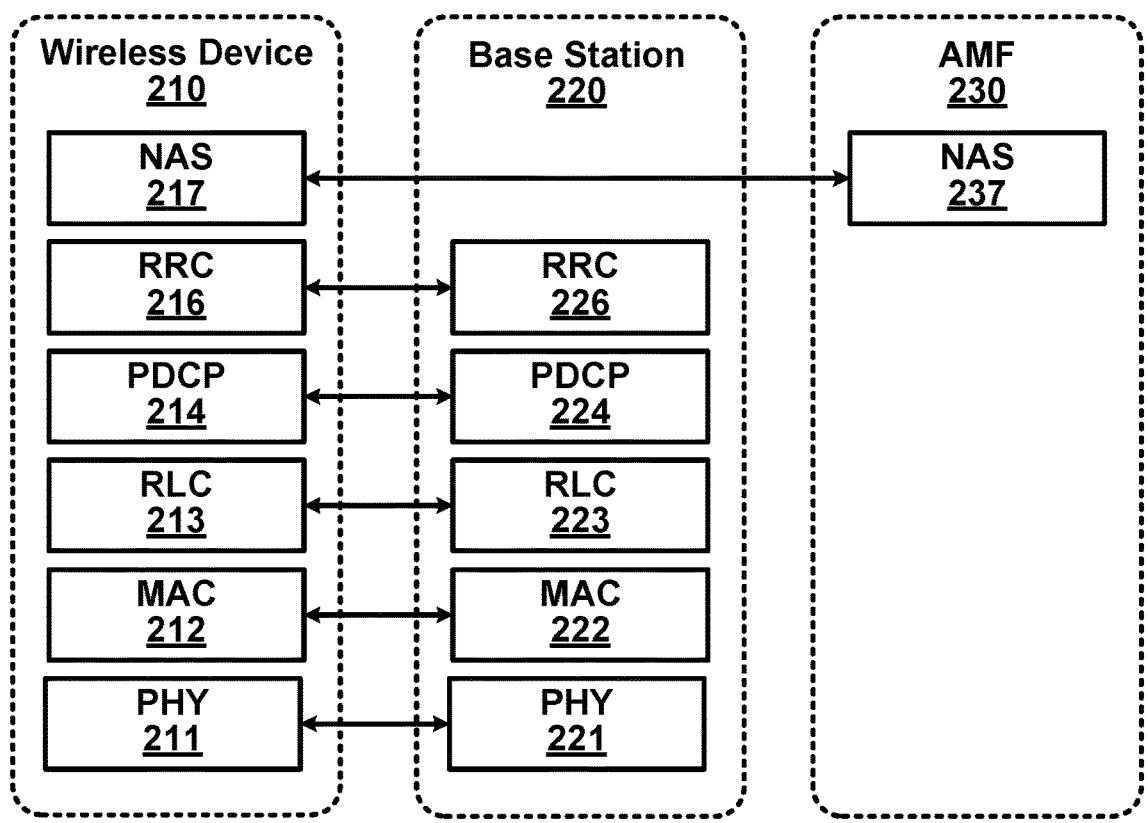
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
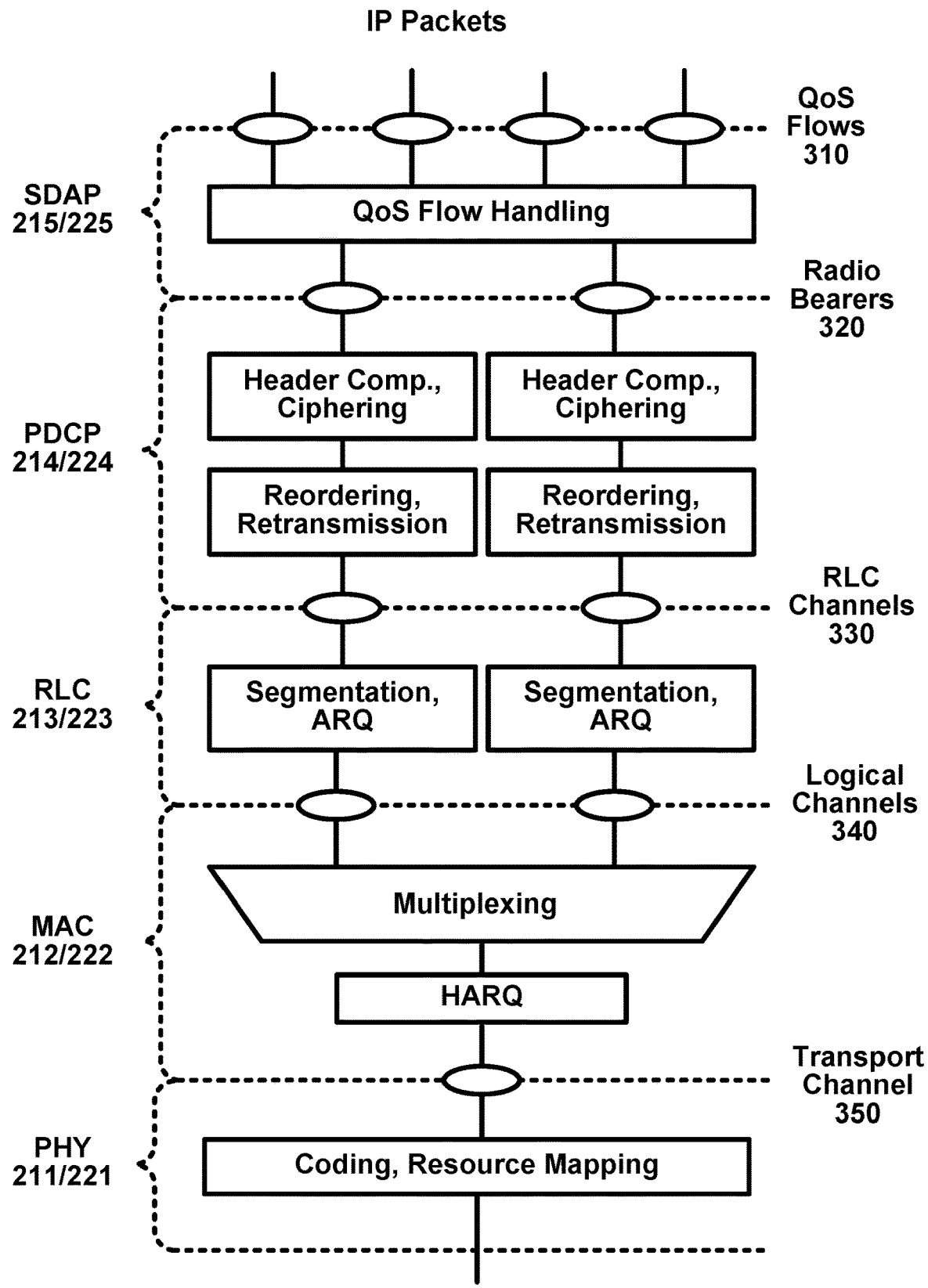
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
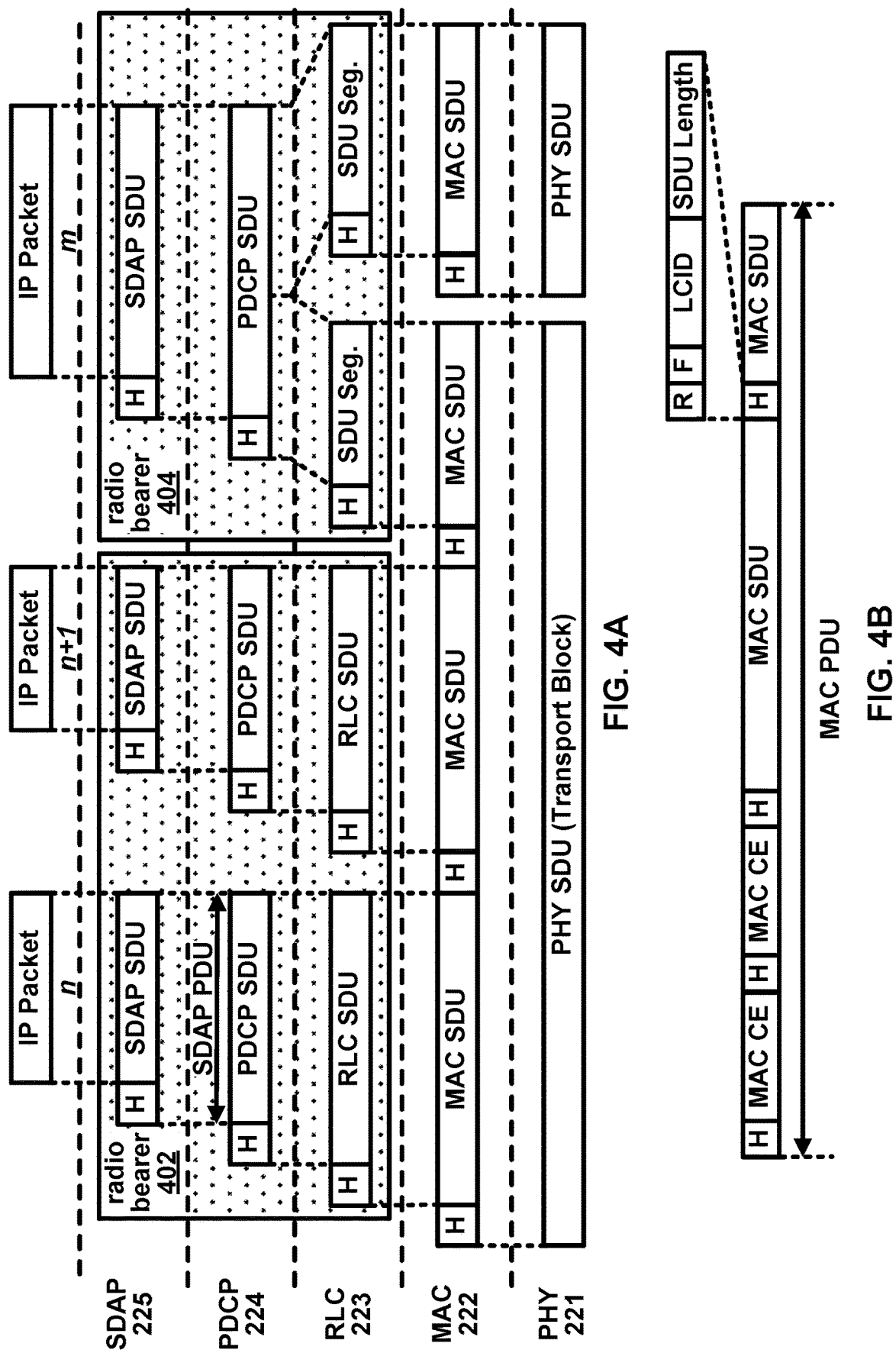
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
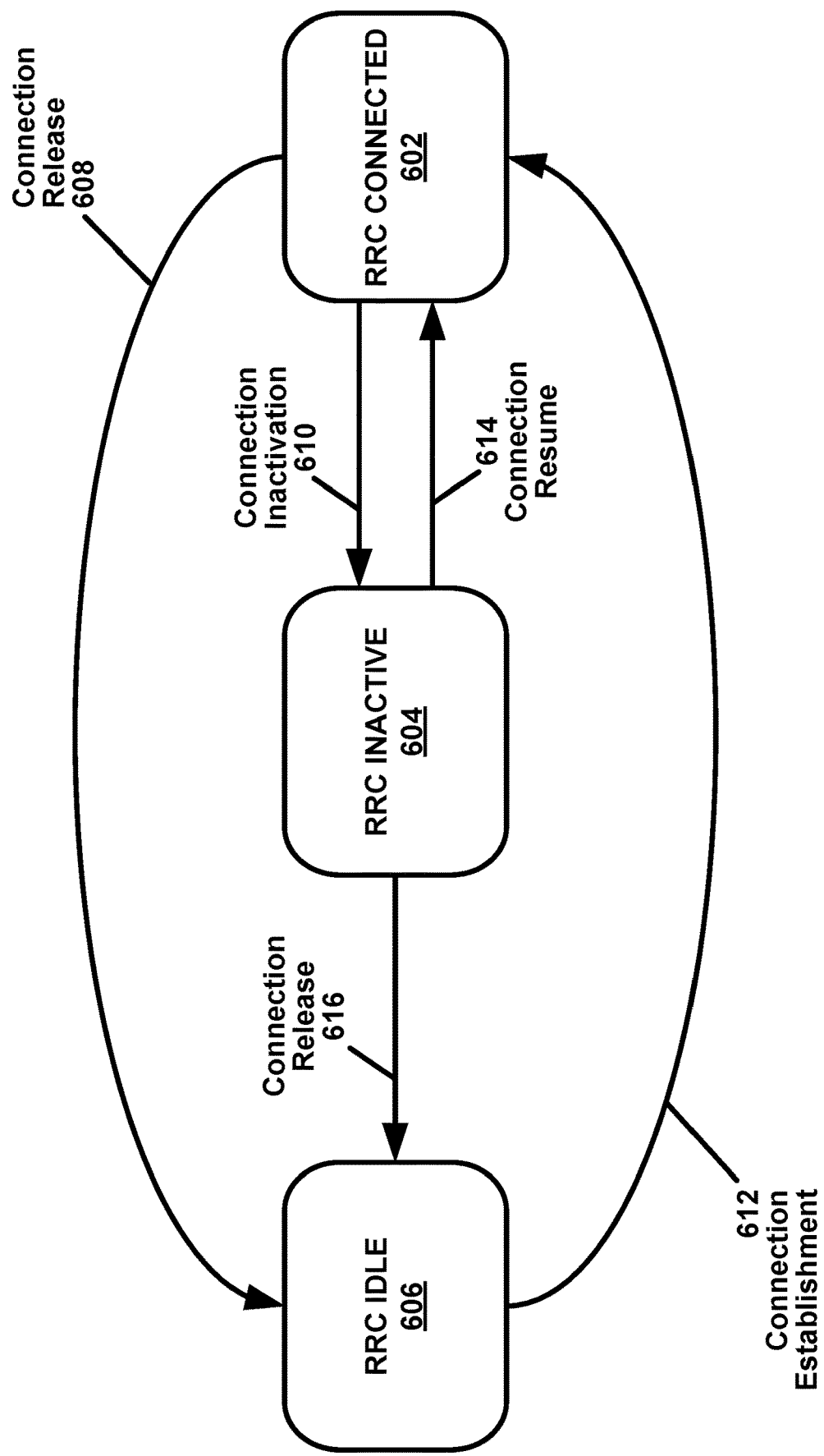
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
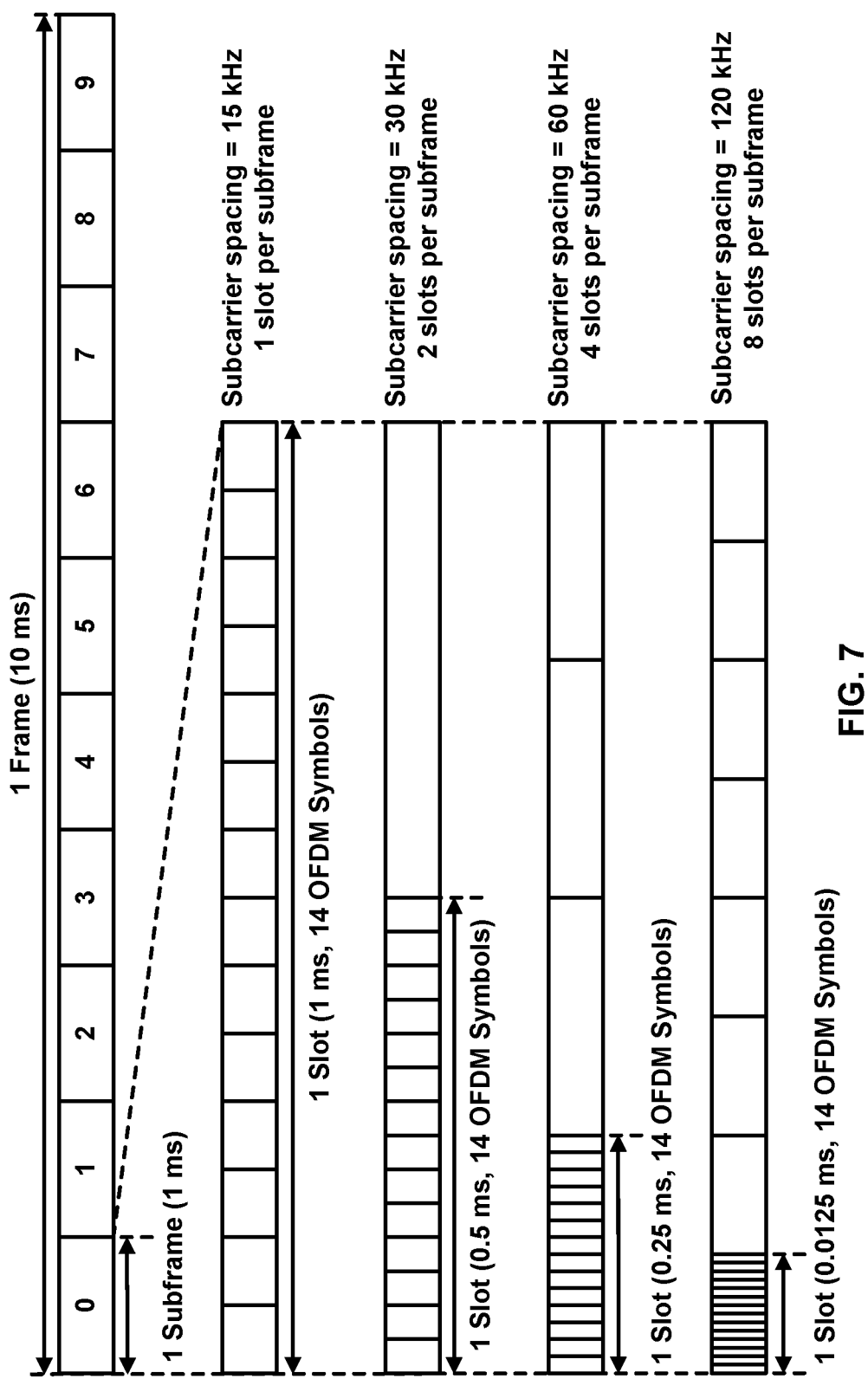
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
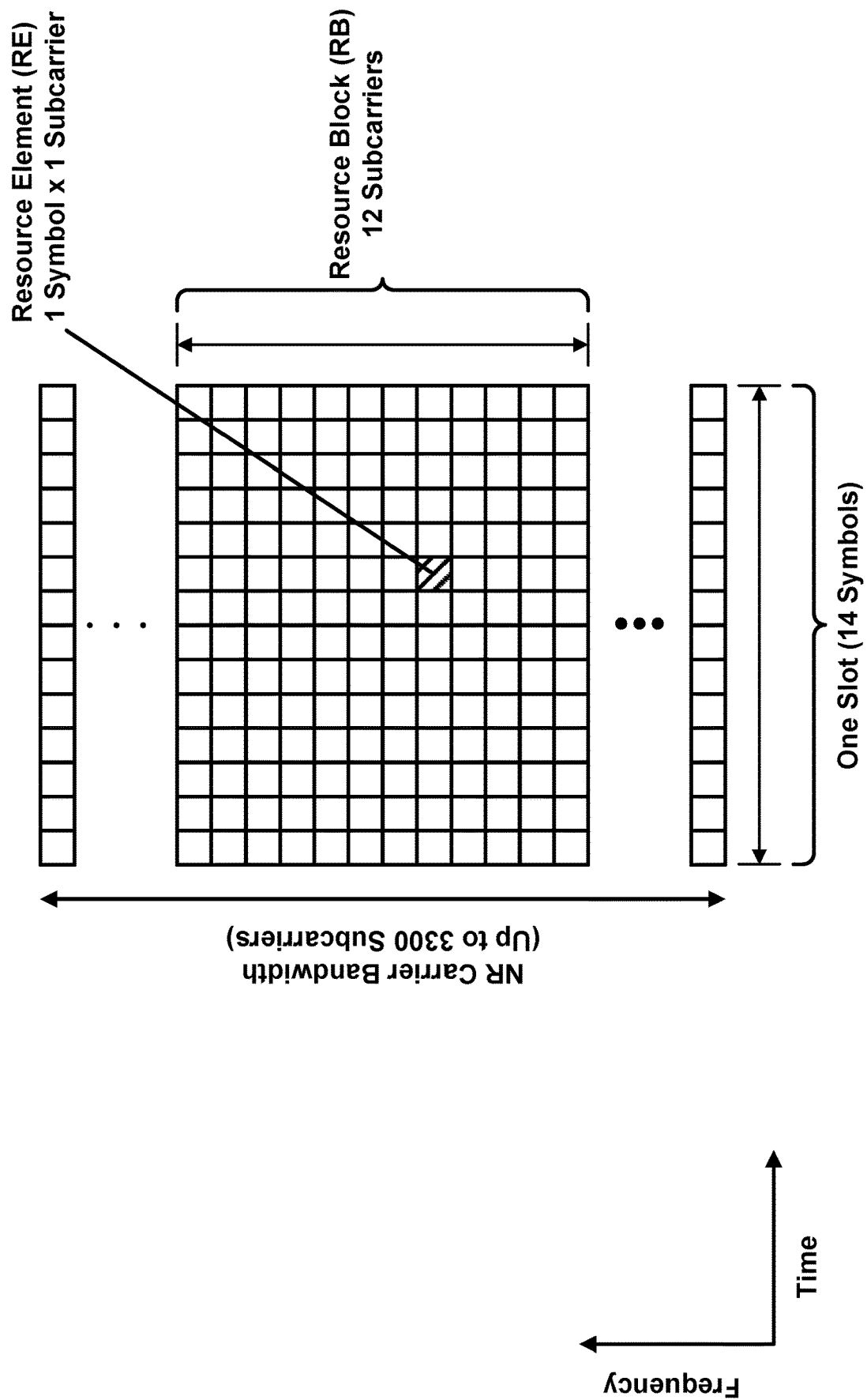
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESTS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after or in response to receiving DCI indicating the second BWP as an active BWP. A wireless device may switch an active BWP from a first BWP to a second BWP, for example, after or in response to an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
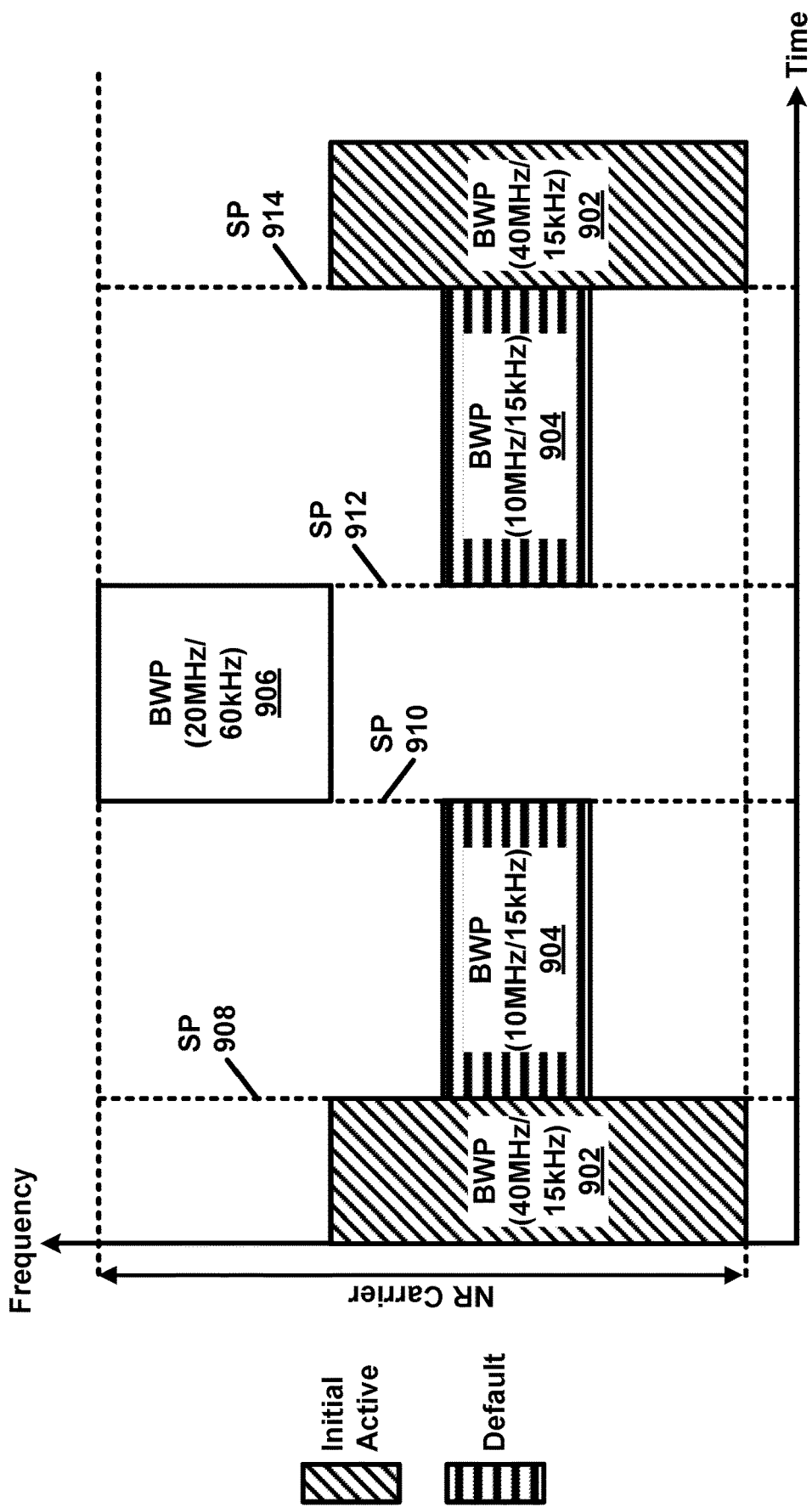
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after or in response to an expiry of a BWP inactivity timer (e.g., indicating switching to the default BWP). The switching at the switching point 908 may occur, for example, after or in response to receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after or in response to an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
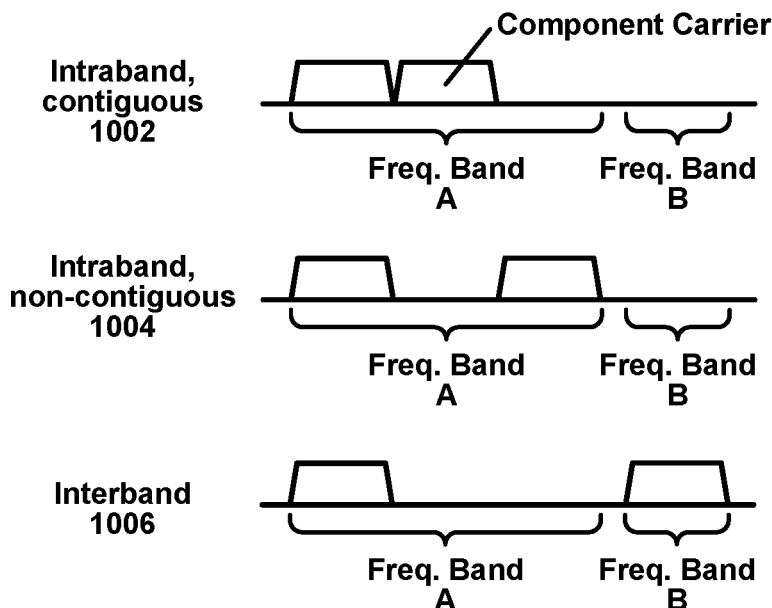
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after or in response to an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
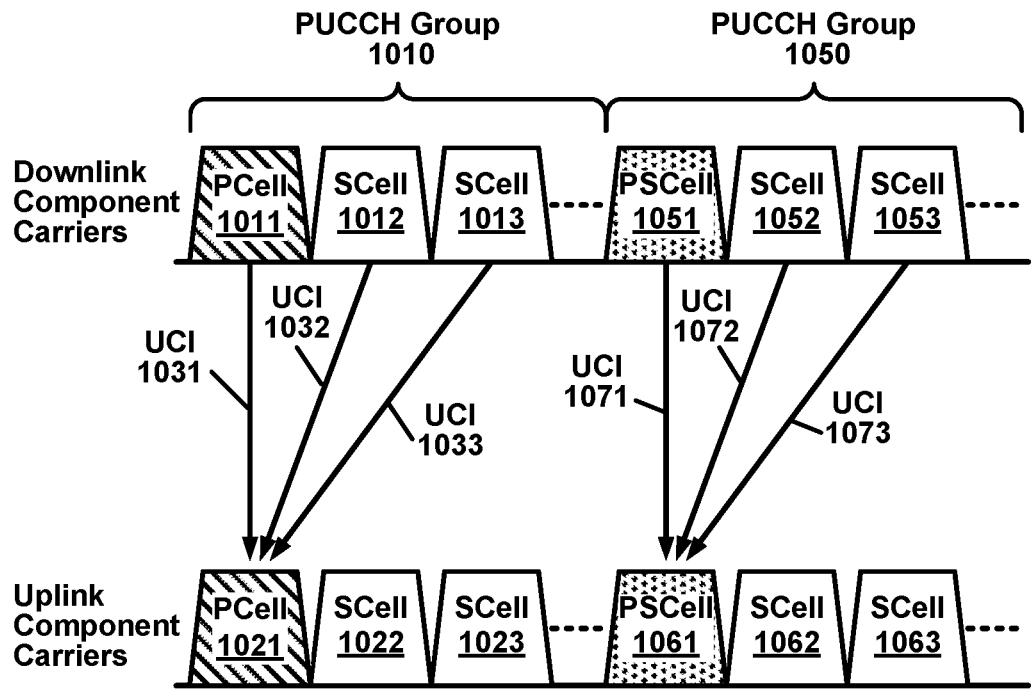
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell

1062 (e.g., a UL SCC), and an SCell 1063 (e.g., a UL SCC). UCI related to the downlink CCs of the PUCCH group 1010, shown as UCI 1031, UCI 1032, and UCI 1033, may be transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
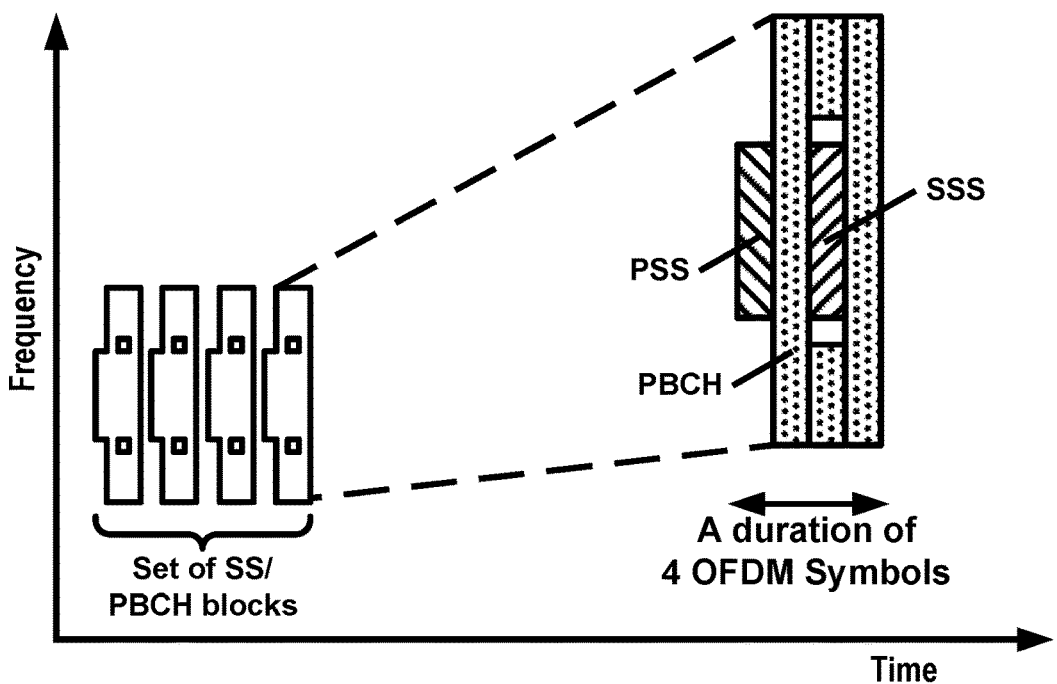
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DM-RSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DM-RSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
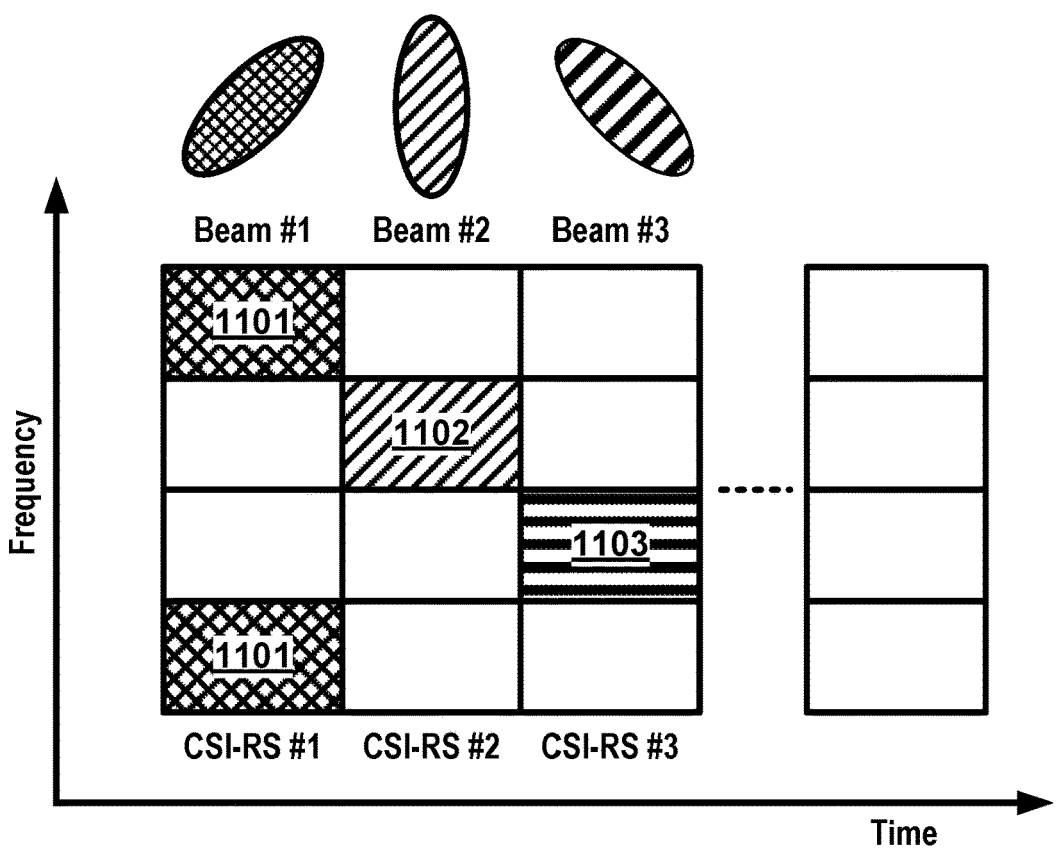
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
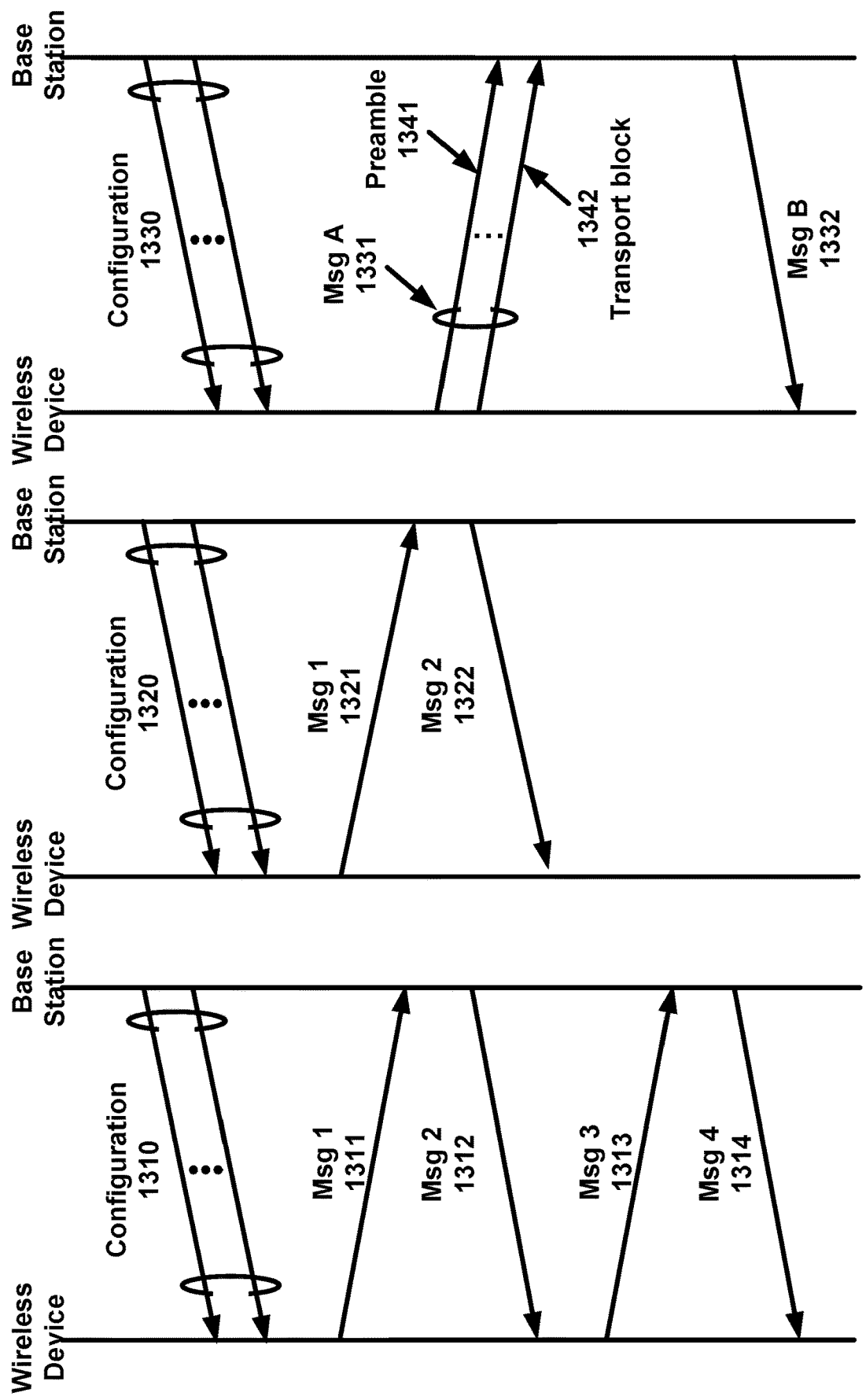
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after or in response to a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after or in response to the transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-RNTI}=1+s\_id+14\times t\_id+14\times 80\times f\_id+14\times 80\times 8\times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after or in response to a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after or in response to the transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after or in response to sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after or in response to transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after or in response to transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
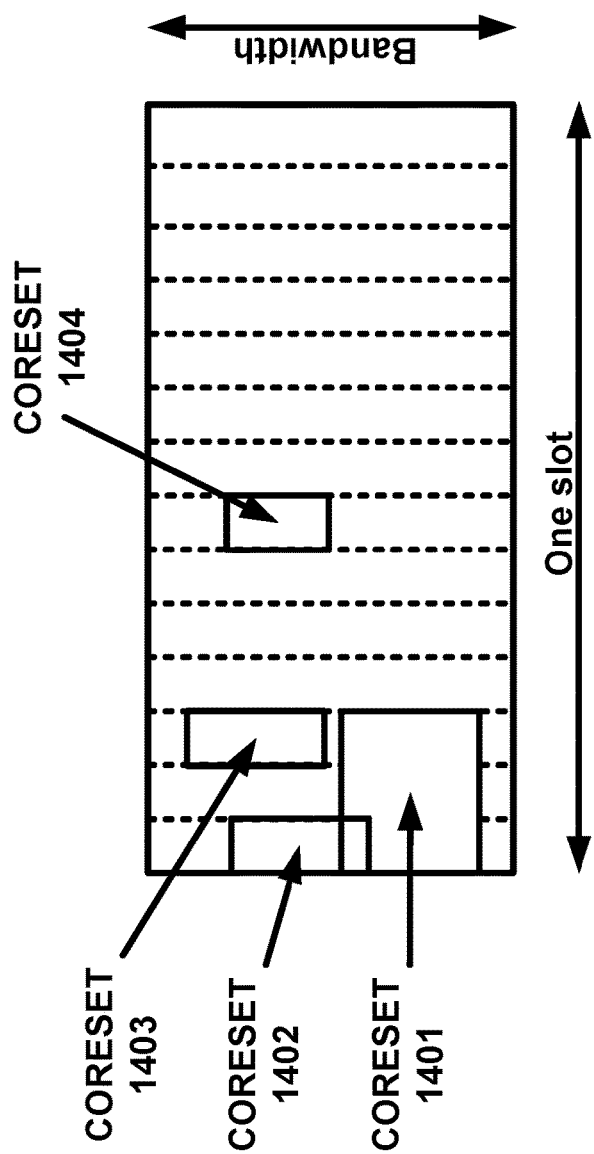
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
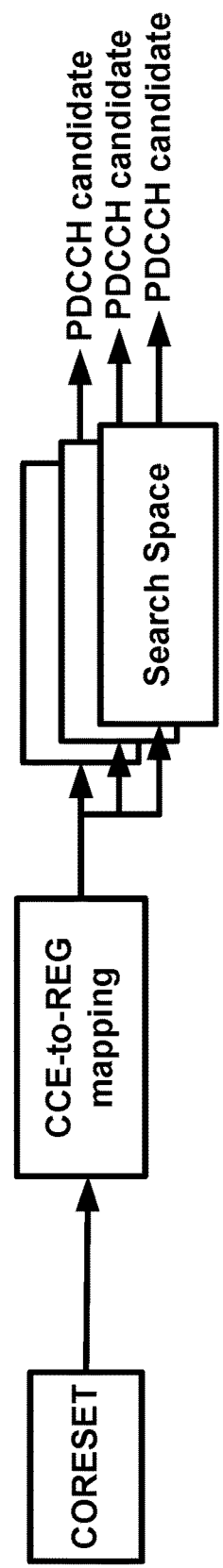
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after or in response to CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after or in response to receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
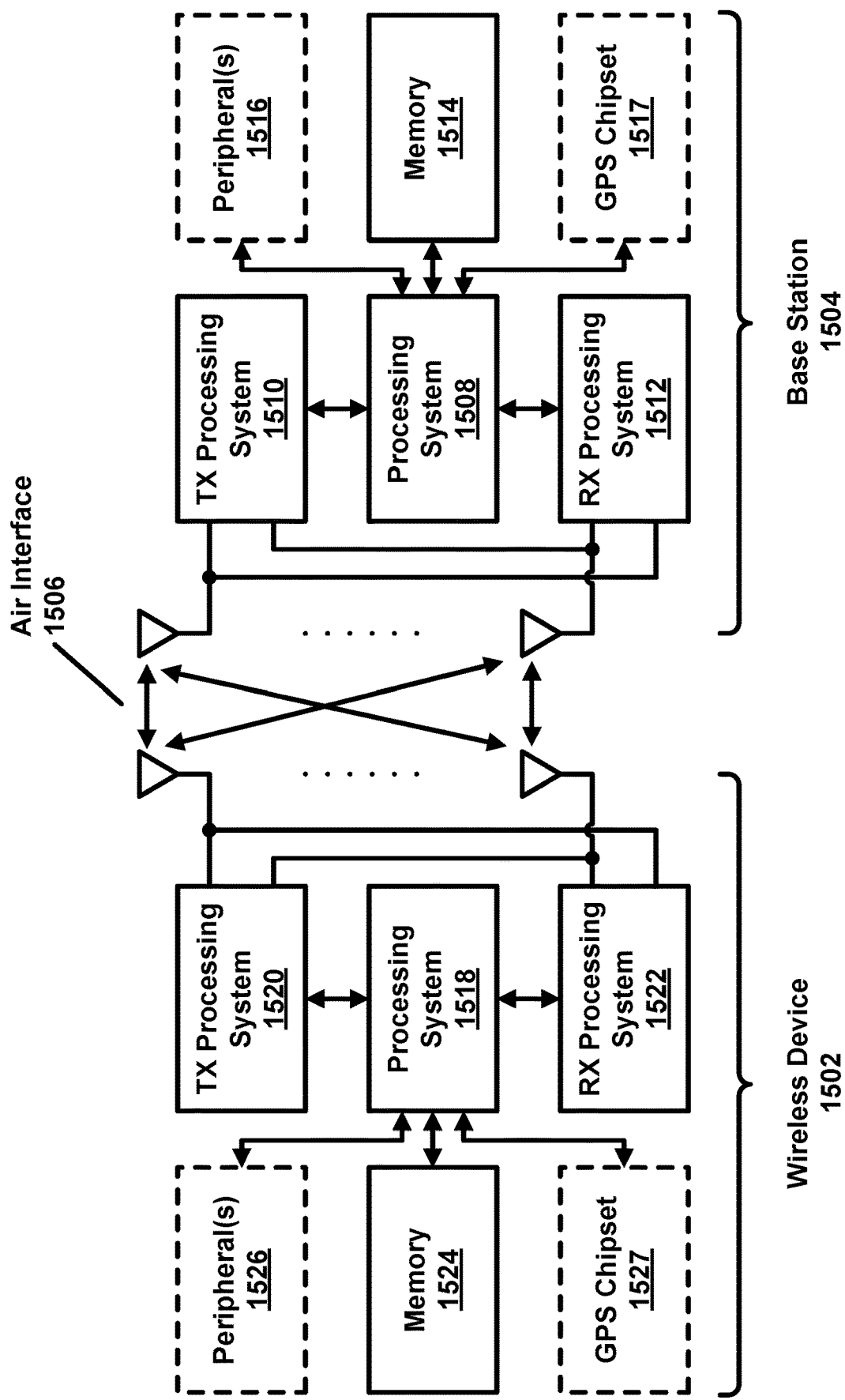
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
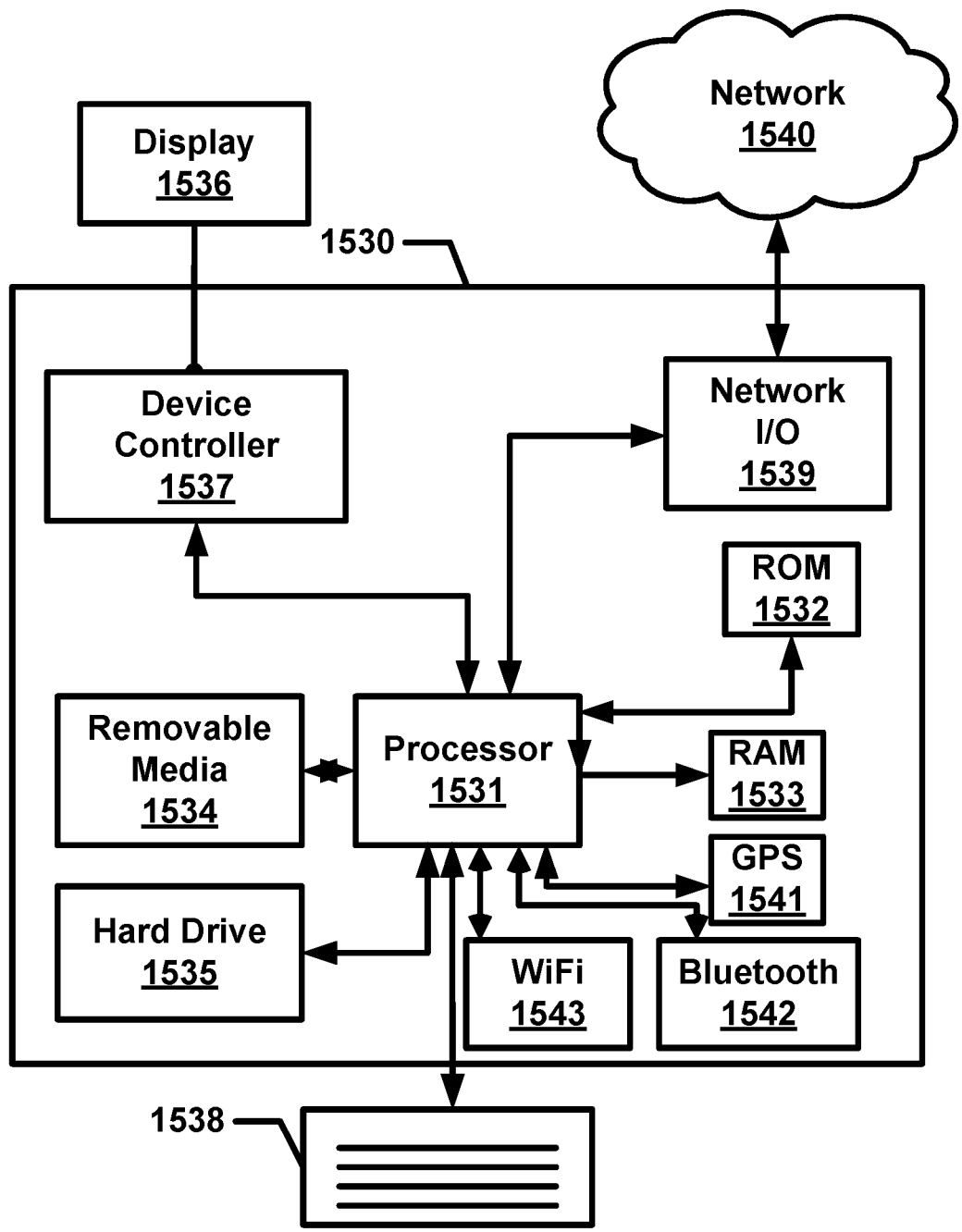
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A four-step contention-based random access (RA) procedure (e.g., as shown in FIG. 13A) may have an associated latency, which may be at least fourteen transmission time intervals (TTI). 3GPP TR 38.804 v14.0.0 indicates a minimum latency (e.g., a minimum latency of fourteen TTIs comprising 3 TTIs after a message from step 1 (e.g., Msg1) of a four-step RA procedure, 1 TTI for a message from step 2 (e.g., Msg2) of a four-step RA procedure, 5 TTIs after the message from step 2, 1 TTI for a message from step 3 (e.g., Msg3) of a four-step RA procedure, 3 TTIs after the message from step 3, and 1 TTI for a message from step 4 (e.g., contention Resolution) of a four-step procedure (e.g., 3+1+5+1+3+1=14)). Reducing the number/quantity of steps in an RA procedure may reduce latency. A four-step random access procedure (e.g., four-step RACH procedure) may be reduced to a two-step random access procedure (e.g., two-step RACH procedure), for example, by using parallel transmissions (e.g. as shown in FIG. 13C). A two-step RACH procedure may have an associated latency (e.g., a minimum of four TTIs), which may be less than an associated latency for a four-step RA procedure. 3GPP TR 38.804 v14.0.0 indicates a minimum latency (e.g., a minimum latency of four TTIs comprising 3 TTIs after a message from step 1 of a two-step RACH procedure and 1 TTI for a message from step 2 of a two-step RACH procedure). Two-step RACH procedures and four-step RACH procedures are used as examples and an individual skilled in the art will appreciate that the description contained herein may apply to any wireless communication procedure, including, for example, any access procedure, random access procedure, and the like.

A random access procedure (e.g., a four-step RACH procedure) may comprise four steps comprising a preamble transmission (e.g., Msg1, which also may be referred to herein as Msg 1), an RAR reception (e.g., Msg2, which also may be referred to herein as Msg 2), an uplink data transmission with a wireless device identity (e.g., Msg3, which also may be referred to herein as Msg 3), and contention resolution (e.g., Msg4, which also may be referred to herein as Msg 4). A random access procedure may comprise fewer steps (e.g., only two steps, such as a two-step RACH). In a two-step RACH procedure, the wireless device may send/transmit a preamble sequence and a data signal (e.g., one or more transport blocks) in one transmission (or substantially simultaneous transmissions) (e.g., MsgA, which also may be referred to herein as Msg A; the first step). The base station may respond to the wireless device by sending/transmitting an RAR (e.g., MsgB, which also may be referred to herein as Msg B), for example, after or in response to detecting the transmission comprising the preamble sequence and the data signal. The RAR (e.g., MsgB) may comprise the detected preamble index, the wireless device identity/identifier, and/or a timing advance. A two-step random access procedure (e.g., a two-step RACH procedure) my result in reduced delay for RACH transmission and/or reduced signaling overhead, for example, for both licensed and unlicensed bands.

A two-step RACH procedure may comprise an uplink (UL) transmission (e.g., a two-step Msg A 1331 shown in FIG. 13C). The UL transmission may comprise a random access preamble (RAP) transmission (e.g., the preamble 1341) and one or more transport blocks transmission (e.g., the transport block 1342). A downlink (DL) transmission (e.g., a two-step Msg B 1332 shown in FIG. 13C) may comprise a response (e.g., an RAR) corresponding to the uplink transmission). The response may comprise contention resolution information. The base station may perform the DL transmission, for example, after or in response to receiving the UL transmission from the wireless device.

A two-step RACH procedure may be able to operate regardless of whether the wireless device has a valid timing advance (TA). A two-step RACH procedure may be applicable to any cell size. A two-step RACH procedure may be applied for an RRC inactive state (e.g., RRC_INACTIVE), an RRC connected state (e.g., RRC_CONNECTED) and/or an RRC idle state (e.g., RRC_IDLE). A two-step RACH procedure may support contention-based random access. The channel structure of an uplink transmission of a two-step RACH procedure (e.g., MsgA) may comprise a preamble and PUSCH carrying payload. PRACH preamble design in at least some types of communications (e.g., communications by wireless devices compatible with 3GPP Release 16, earlier/later 3GPP releases, and/or any other access technologies) may be used for a two-step RACH procedure. PUSCH including a DM-RS for transmission of payload of MsgA may be used for a two-step RACH procedure. The PRACH preamble and the PUSCH in a MsgA may be multiplexed in a time domain (TDMed). The gap between the preamble and PUSCH may need to be short enough such that the MsgA can be sent/transmitted using one listen-before-talk (LBT), for example, for wireless devices operating in unlicensed bands or any other bands. The PRACH preamble and/or a PRACH occasion and the time-frequency resource of PUSCH in MsgA and DM-RS may be mapped for the uplink transmission of the two-step RACH procedure. The MsgA configuration in a two-step RACH may be sent/transmitted (e.g., broadcast) by the base station to the wireless device (e.g., via system information) and/or configured using dedicated signaling (e.g., RRC signaling). A base station may send/transmit one or more messages (e.g., RRC messages) to configure a wireless device with one or more parameters of a two-step RACH configuration. The one or more messages (e.g., RRC messages) may comprise parameters for transmitting the uplink transmission of a two-step RACH (e.g., MsgA). The parameters may indicate at least one of: a PRACH resource allocation, a preamble format, SSB information (e.g., total number/quantity of SSBs, downlink resource allocation of SSB transmission, transmission power of SSB transmission, and/or other information), and uplink radio resources for one or more transport block transmissions (e.g., uplink radio resources indicated by a UL grant). The same PRACH resources may be shared for one or more four-step RACH procedures and one or more two-step RACH procedures. One or more four-step RACH resources may be configured regardless whether a two-step RACH is configured or not. The configuration of a two-step RACH procedure may reuse the configuration of a four-step RACH procedure with one or more additional information (e.g., a UL grant, and/or UL grant to SSB association, and/or UL grant to PRACH occasion mapping, and/or UL grant to preamble mapping, etc.), for example, to save duplicated signaling. One or more other procedures (e.g., RACH-less, RACH-skip, PUSCH-only, or RACH-less PUSCH transmission procedures) may be grouped into a first type of access procedure or a first type of random access procedure, for example, in addition to the two-step RACH procedure. One or more other procedures that may have longer latency than the first type of access procedure may be grouped into a second type of access procedure or a second type of random access procedure, for example, in addition to the four-step RACH procedure. Although the four-step RACH procedure and the two-step RACH procedure may be compared to each other in one or more examples described herein, one or more examples described herein with respect to the two-step RACH procedure may be applicable to any of the first type of access procedure or the first type of random access procedure, and/or one or more examples described herein with respect to the four-step RACH procedure may be applicable to any of the second type of access procedure or the second type of random access procedure.

Figure 17:
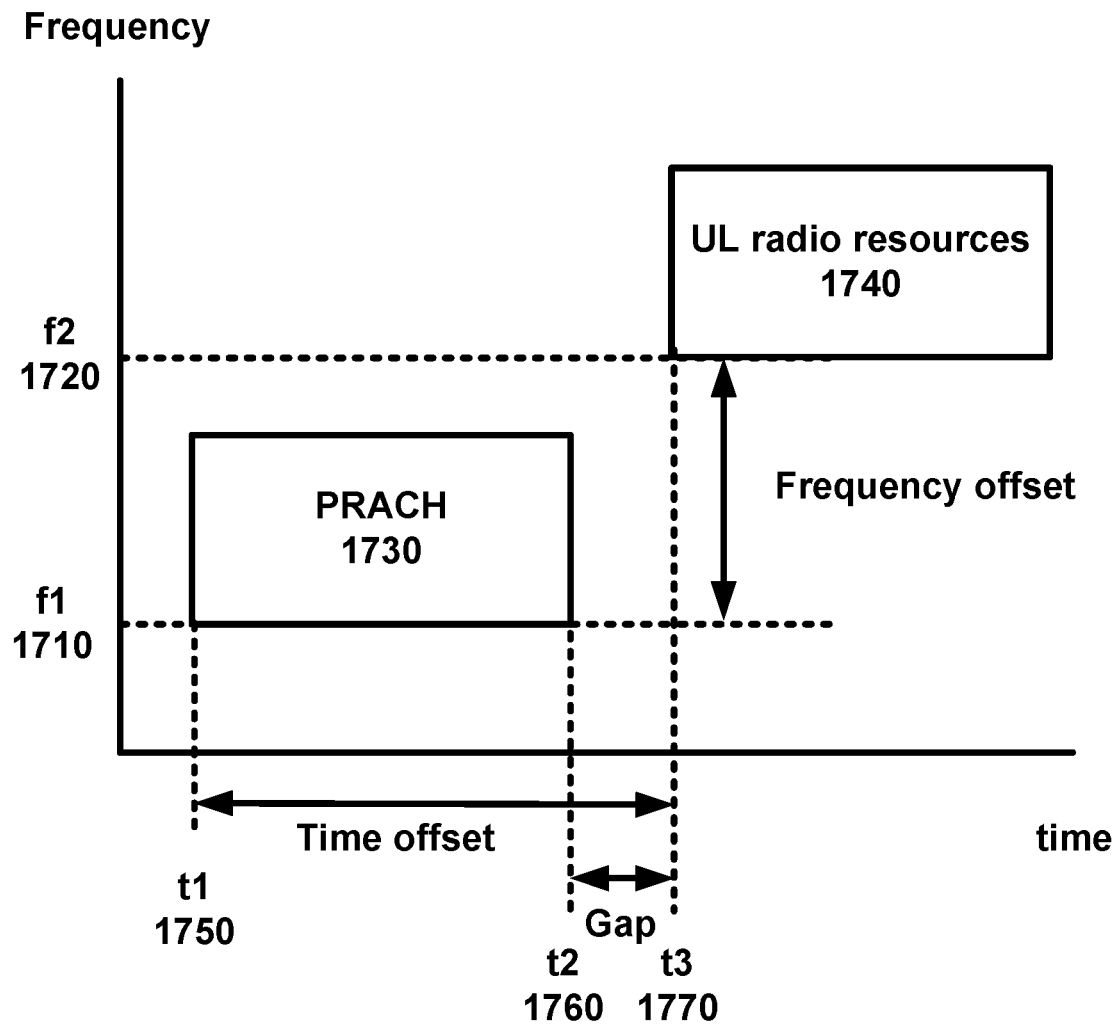
FIG. 17 shows an example radio resource allocation for a random access procedure.

FIG. 17 shows an example radio resource allocation for a random access procedure. The radio resource allocation may be for a two-step RA procedure. PRACH 1730 and uplink (UL) radio resources 1740 may be time-multiplexed, for example, if a frequency offset 1750 in FIG. 17 is zero and/or if a frequency range for the PRACH 1730 and a frequency range for the UL radio resource 1740 overlap (e.g., partially or fully overlap). The PRACH 1730 and the UL radio resources 1740 may be frequency-multiplexed, for example, if a time offset 1760 in FIG. 17 is zero (e.g., if the gap between 73 1770 and t2 1760 is zero) and/or if a timing for the PRACH 1730 and a timing for the UL radio resources 1740 overlap (e.g., partially or fully overlap, such that t2 1760 may be greater than t3 1770). The PRACH 1730 and the UL radio resources 1740 may be time-multiplexed and/or frequency-multiplexed. The PRACH 1730 and the UL radio resources 1740 may not be time-multiplexed or frequency-multiplexed. The frequency offset (e.g., the difference of f2 1720 and f1 1710) in FIG. 17 may be an absolute quantity/number, for example, in terms of Hz, MHz, or GHz or any other frequency units, and/or a relative quantity/number, for example, one of the frequency indexes may be predefined/preconfigured. The time offset (e.g., the difference of t2 1760 and t1 1750) may be an absolute quantity/number, for example, in terms of micro-second(s), milli-second(s), or second(s) and/or a relative quantity/number, for example, in terms of subframe, slot, mini-slot, OFDM symbol, and/or any other duration.

A preamble and a payload may both be sent (e.g., transmitted) in a first message uplink transmission, such as a MsgA (e.g., Msg A 1320, Msg A 1331, or another MsgA as described above), in a random access procedure (e.g., a two-step RACH procedure or any other RACH procedure). A receiver sensitivity for the preamble and payload may be different (or the same). It is possible that the base station may detect the preamble successfully and fail to detect the payload (e.g., part or the entire portion of the payload). The base station may configure a payload transmission power to be offset to a preamble transmission power (and/or the base station may configure the preamble transmission power to be offset to the payload transmission power), for example, to compensate the different receiver sensitivity. There may be one or more (e.g., two) possible alternatives if the base station detects the preamble successfully and fails to detect the payload. The base station may fall back to a four-step RACH procedure or retransmit a payload in MsgA, for example, if the base station detects the preamble successfully and fails to detect the payload.

A random access procedure (e.g., a two-step RACH procedure or any other random access procedure) may fall back to an alternate procedure (e.g., a four-step RACH procedure or any other random access procedure), Fallback from a two-step RACH procedure to a four-step RACH procedure may be determined by a base station. Fallback from two-step RACH procedure to four-step RACH procedure may work as follows. A base station may send a message (e.g., content) identical to (or substantially the same as) a second message, such as a Msg2 (e.g., Msg 2 1312, Msg 2 1322, or another Msg2 as described above), to the wireless device at the second step, for example, if the base station only detects the preamble and does not successfully receive and/or decode the payload. The wireless device may use/perform the same (or substantially the same) operation on the reception of the message as the second step (e.g., the RAR of the four-step RACH procedure, such as a Msg2 reception) in a four-step RACH procedure (e.g., such as described above with respect to FIG. 13A). The wireless device may send (e.g., transmit) a third message, such as a Msg3 (e.g., Msg 3 1313 or another Msg3 as described above) according to the UL grant in the received RAR, for example, if the MsgB (e.g., Msg B 1332 or another MsgB as described above) identical with (or substantially the same as) a Msg2 (e.g., Msg 2 1322 or another Msg2 as described above) is received by the wireless device. The fallback mechanism may avoid the retransmission of a contention-based RA (CBRA) preamble and/or maintain the same (or substantially the same) latency as a four-step RA procedure.

A wireless device may resend (e.g., retransmit) a payload portion of a message. The wireless device may resend the payload portion of the message from the payload PHY layer buffer. The wireless device may resend (e.g., retransmit) the payload part from the payload PHY layer buffer, for example, if the base station only detects the preamble and not the payload. The wireless device may resend (e.g., retransmit) the payload part from the payload PHY layer buffer, for example, based on a NACK indication in MsgB. The retransmission of the payload may be treated as the HARQ of payload. The payload retransmission may introduce the HARQ process for a payload. The payload retransmission may introduce a new message (e.g., MsgC or any other message). The payload retransmission may not introduce a new message, for example, if a Msg2 and/or a MsgB is transmitted. A RACH procedure may become more complicated without a benefit in terms of performance latency. Falling back to a fallback random access procedure (e.g., a four-step RACH procedure) may be easy and preferable than alternatives such as maintaining and/or repeating an existing random access procedure (e.g., a two-step RACH procedure) and/or declaring a failure. The wireless device may fall back to a fallback random access procedure (e.g., a four-step RACH procedure), for example, if a counter and/or timer of another random access procedure (e.g., a two-step RACH procedure using a MsgA failed transmission) expires.

A second message (e.g., a MsgB) may be sent if a preamble in a first message (e.g., a MsgA) is detected. The content of the second message (e.g., MsgB) may be different, for example, based on whether the payload in the first message (e.g., MsgA) is successfully decoded. A message of a second step in a random access procedure may be a MsgB for a two-step RACH contention resolution, for example, if both a MsgA preamble and payload are successfully detected and decoded. A preamble ID (e.g., a random access preamble ID (RAPID)) in an RAR may be redundant, such that it may be used as the contention resolution ID (e.g., C-RNTI used/in the payload may satisfy/fulfill a contention resolution purpose). An UL grant may be optional. The UL grant may be used to schedule the possible uplink data packets after the RACH procedure, for example, if a buffer status report (BSR) is reported in the first message (e.g., MsgA). The wireless device may fall back to a fallback random access procedure (e.g., a four-step RACH procedure), for example, if the preamble is successfully detected and the payload is not successfully decoded. The message of a second step of the fallback random access procedure may be identical to (or substantially the same as) a second message in another random access procedure (e.g., Msg2 in a two-step random access procedure). The message may comprise an RAR that indicates a RAPID, a TC-RNTI, and/or an UL grant (e.g., for Msg3 in a four-step random access procedure). The wireless device may alternatively resend (e.g., retransmit) the payload in MsgA. An NACK may be indicated in the message of the second step, for example, if the wireless device resends/retransmits the payload (e.g., in MsgA). The message may further comprise an UL grant for retransmission, a timing advance (TA) command, a TC-RNTI, a power control command, and/or other HARQ information.

Triggers for a fallback random access procedure (e.g., a four-step RACH procedure) may be used for another random access procedure (e.g., a two-step RACH procedure). A random access procedure (e.g., a two-step RACH procedure) may be useful for one or more configurations (e.g., unlicensed bands, small cells, and handovers). A wireless device may be required and/or used to perform LBT, for example, before accessing the channel in an unlicensed band. There may be multiple LBT procedures at either the wireless device and/or the base station side, for example, if a fallback random access procedure (e.g., a four-step RACH procedure) is used. Performing multiple LBT procedures may result in higher channel access failure probability for an RA procedure. Simplifying the RACH procedure may reduce the quantity/number of LBT procedures, for example, in an unlicensed band. A two-step RACH procedure may use an unlicensed band. The simplified procedure of a two-step RACH procedure may be beneficial to complete a RACH procedure more quickly relative to a fallback random access procedure (e.g., a four-step RACH). The transmission propagation delay of the wireless devices may be small in certain configurations (e.g., in a small cell). The transmission propagation delay may be small, for example, because it may be compensated by normal cyclic prefix (CP) for data transmission. A two-step RACH procedure may be useful to reduce the signaling overhead of RACH procedure in a small cell. There may be no TA issue for the wireless devices operating in a small cell, for example, because TA may be zero/negligible. For at least some wireless devices, a two-step RACH procedure may be beneficial to quickly prepare for data transmission. Small cells may be more likely to be deployed in an unlicensed band than in a licensed band. A two-step RACH procedure may be advantageous for use in small cells and/or in an unlicensed band.

A handover (HO) may be performed for a wireless device. A wireless device may be informed by the network in a HO command about the TA of the target cell. A wireless device may be informed by the network in the HO command about the TA of the target cell, for example, if the wireless device performs handover from an SCell to a PCell. There may be no TA issue for the wireless device and/or TA may not be necessary to obtain by RACH procedure, for example, if the wireless device performs handover from an SCell to a PCell. A two-step RACH procedure may be beneficial to quickly complete the handover procedure. A two-step RACH procedure in which the wireless device sends/transmits PUSCH only in a first message (e.g., MsgA), for example, may be used/performed. The TA may be useful for the two-step RACH, for example, if the cell range may not be limited. The wireless device may omit the preamble in the first message (e.g., MsgA), for example, if the wireless device receives the TA value of the target cell in the handover. MsgA may comprise (or may only consist of) the PUSCH payload without comprising a preamble, for example, if the TA is acquired by the HO command. The design of two-step RACH may be reused for the two-step RACH without a preamble (e.g., RACH-less, RACH-skip, or PUSCH-only), which may retain a benefit of low latency. The first message (e.g., MsgA) in a two-step RACH procedure may comprise a PRACH preamble and a PUSCH transmission in certain configurations. The first message (e.g., MsgA) in a two-step RACH procedure may comprise a PUSCH transmission.

A base station may perform beam sweeping. The base station may perform beam sweeping, for example, to receive a PUSCH transmission of a first message (e.g., MsgA). Beam correspondence may be addressed, for example, to avoid beam sweeping for a PUSCH transmission of the first message (e.g., MsgA). A second frequency resource (e.g., FR2) may associate the PUSCH transmission of the first message (e.g., MsgA) and the received SSB. Association between the time and frequency resource of the PUSCH transmission (e.g., PUSCH occasion) and SSB may be beneficial for the base station for a first frequency resource (e.g., FR1), for example, because it may reduce the power consumption for beam sweeping. The PUSCH occasion may be associated with a particular SSB. The association between SSB and PUSCH occasion may be configured by SIB/MIB. The beam or SSB index information may be explicitly carried in the payload in a first message (e.g., MsgA). The base station may not be able to decide the right beam of a second message (e.g., Msg2, MsgB, etc.), for example, if the payload is not successfully decoded (e.g., by the base station).

A random access procedure (e.g. two-step RACH) may support short and/or long PRACH preamble formats. A two-step RACH procedure may support a PRACH configuration with multiple ROs within a PRACH slot. The two-step RACH procedure may support a PRACH preamble mapping to multiple PUSCH allocations. The PUSCH allocations may be FDM and/or TDM. The two-step RACH procedure may support a PRACH transmission (e.g., a PRACH preamble) and a PUSCH transmission in a single slot. One or more PRACH preambles may be mapped to one DM-RS. The base station may use a DM-RS of the PUSCH in a first message (e.g., MsgA) for channel estimation. The base station may use the PRACH preamble for channel estimation of the PUSCH transmission in the first message (e.g., MsgA), for example, if the PRACH and the PUSCH resources are close in time and/or frequency (e.g., within a particular time gap and/or within a particular frequency offset). The base station may detect/determine if the DM-RS collided and/or whether to use the DM-RS for the channel estimation, for example, based on the detected PRACH preamble. The ratio of the PRACH/DM-RS used in the mapping of the PRACH preambles to the PUSCH DM-RS may be selected, for example, based on the proximity of the PRACH and the PUSCH resources. One or more preambles may be mapped to a PUSCH transmission in a unique time and frequency resource. This mapping may reduce the likelihood of failed PUSCH decoding, for example, due to collision, and/or may increase the two-step RACH physical layer overhead in the uplink.

A wireless device may be configured with a fallback random access configuration (e.g., a four-step RACH configuration). A wireless device may be configured with a four-step RACH configuration, for example, regardless of whether a two-step RACH configuration exists. The wireless device may select which type of RACH procedure to use to initiate a RACH procedure, for example, if the base station configures the wireless device with a fallback random access procedure (e.g., a four-step RACH procedure) and another random access procedure (e.g., a two-step RACH procedure). The base station may indicate to the wireless device which type of PRACH to use. The wireless device may select which type of PRACH to use based on, for example, the trigger event, and/or prioritized rule, etc. It may not matter to the network which type of RACH procedure the wireless device selects, for example, because trigger events of random access procedures (e.g., two-step and four-step RACH procedures) may be the same and/or cell radiuses supported by random access procedures (e.g., two-step and four-step RACH procedures) may be the same. The wireless device may select/determine whether to initiate a two-step RACH procedure or a four-step RACH procedure (e.g., in initial access). The base station may provide information (e.g., give assistive guidance) and/or use some predefined rule to help the wireless device make the selection/determination. The wireless device supporting a two-step RACH procedure may always select the two-step RACH procedure, for example if a received target power for the preamble and PUSCH transmission may be achieved. The wireless device may select/determine between a two-step RACH procedure and a four-step RACH procedure (or any other random access procedure) based on an RSRP. The wireless device may select/determine two-step RACH, for example, if the measured RSRP exceeds a threshold (e.g., a pre-defined or a pre-configured threshold). The base station may select/determine four-step RACH, for example, if the measured RSRP is below the threshold. The base station may select any type of random access procedure, for example, based on the threshold.

Figure 18:
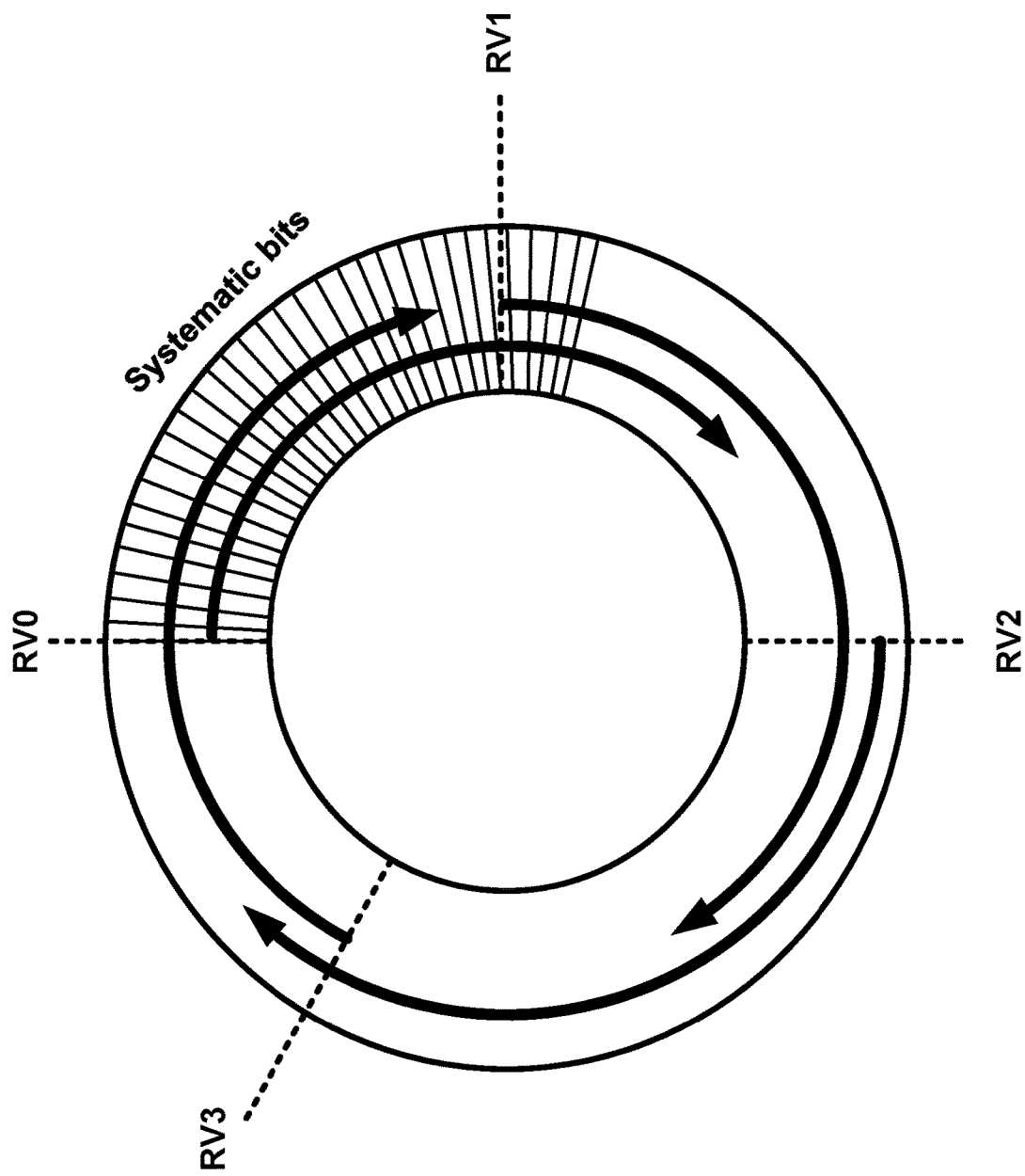
FIG. 18 shows an example of redundancy versions.

FIG. 18 shows an example of redundancy versions. Transmit bits may be generated from coded bits based on redundancy versions. A base station may perform rate matching for at least some code blocks. The base station may write coded bits into a circular buffer, for example, as shown in FIG. 18. The coded bits may start with non-punctured systematic bits and continue with parity bits. The base station may select transmit bits, for example, based on reading a required quantity/number of bits from the circular buffer. The exact selected bits for transmission may depend on a redundancy version (RV) (e.g., RV0, RV1, RV2, or RV3) corresponding to a different starting position in the circular buffer. The base station may generate (e.g., based on selecting a different RV) a different set of coded bits representing a same set of information bits. The different starting positions in the circular buffer may be defined such that both RV0 and RV3 may be self-decodable. For example, RV0 and RV3 may include systematic bits under typical examples.

HARQ functionality may comprise soft combining. A wireless device may perform soft combining to decode a transport block with retransmission via different RVs. Rate-matching functionality may comprise interleaving coded bits using a block interleaver and collecting coded bits from at least some code blocks. The coded bits from the circular buffer may be written row-by-row into a block interleaver. The coded bits from the circular buffer may be read out column-by-column. The quantity/number of rows in the interleaver may be determined by a modulation order. The coded bits in one column may correspond to one modulation symbol. The systematic bits may spread across the modulation symbols which may improve system performance Bit collection may concatenate coded bits for at least some code blocks.

A wireless device (e.g., supporting high reliability and low latency services) may be configured with repetition transmission. A wireless device may be configured with repetition transmission, for example, based on one or more repetition parameters (e.g., pusch-AggregationFactor or pdsch-AggregationFactor larger than 1). A same symbol allocation may be applied/used across the repetition transmission (e.g., the same symbol allocation may be applied/used across pusch-AggregationFactor or pdsch-AggregationFactor consecutive slots). The wireless device may determine and/or expect that a TB may be repeated within at least some symbol allocations among at least some of the slots (e.g., pusch-AggregationFactor or pdsch-AggregationFactor consecutive slots).

Figures 19A, 19B:
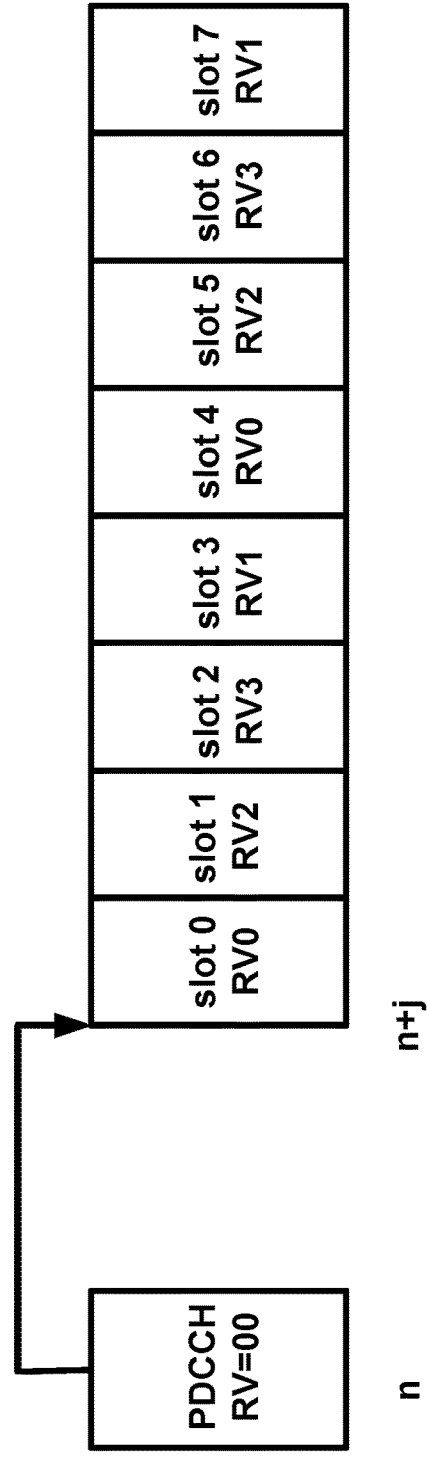
FIG. 19A and FIG. 19B show examples of using redundancy versions for repetitions of a transmission.

FIG. 19A and FIG. 19B show examples of using redundancy versions for repetitions of a transmission. FIG. 19A and FIG. 19B show, for example, using redundancy versions for repetitions of a TB. The redundancy versions may be applied to repetitions of one or more transport blocks. A base station may send (e.g., transmit) the TB via/on a PDSCH with/using a single transmission layer. The base station may apply/use a redundancy version on an nth transmission occasion of the TB (e.g., according to FIG. 19A). The wireless device may determine that the redundancy version is 0, for example, if the base station indicates, to the wireless device, a redundancy version indication (e.g., $rv_{id}=0$) via DCI and if n modulo 4 is equal to 0. The wireless device may determine that the redundancy version is 2, for example, if the base station indicates, to the wireless device, a redundancy version indication (e.g., $rv_{id}=0$) via DCI and if n modulo 4 is equal to 1. The wireless device may determine that the redundancy version is 3, for example, if the base station indicates, to the wireless device, a redundancy version indication (e.g., $rv_{id}=0$) via DCI and if n modulo 4 is equal to 2. The wireless device may determine that the redundancy version is 1, for example, if the base station indicates, to the wireless device, a redundancy version indication (e.g., $rv_{id}=0$) via DCI and if n modulo 4 is equal to 3. The wireless device may determine that the redundancy version is 2, for example, if the base station indicates, to the wireless device, a redundancy version indication (e.g., $rv_{id}=2$) via DCI and if n modulo 4 is equal to 0. The wireless device may determine that the redundancy version is 3, for example, if the base station indicates, to the wireless device, a redundancy version indication (e.g., $rv_{id}=2$) via DCI and if n modulo 4 is equal to 1. The wireless device may determine that the redundancy version is 1, for example, if the base station indicates, to the wireless device, a redundancy version indication (e.g., $rv_{id}=2$) via DCI and if n modulo 4 is equal to 2. The wireless device may determine that the redundancy version is 0, for example, if the base station indicates, to the wireless device, a redundancy version indication (e.g., $rv_{id}=2$) via DCI and if n modulo 4 is equal to 3. The wireless device may determine that the redundancy version is 3, for example, if the base station indicates, to the wireless device, a redundancy version indication (e.g., $rv_{id}=3$) via DCI and if n modulo 4 is equal to 0. The wireless device may determine that the redundancy version is 1, for example, if the base station indicates, to the wireless device, a redundancy version indication (e.g., $rv_{id}=3$) via DCI and if n modulo 4 is equal to 1. The wireless device may determine that the redundancy version is 0, for example, if the base station indicates, to the wireless device, a redundancy version indication (e.g., $rv_{id}=3$) via DCI and if n modulo 4 is equal to 2. The wireless device may determine that the redundancy version is 2, for example, if the base station indicates, to the wireless device, a redundancy version indication (e.g., $rv_{id}=3$) via DCI and if n modulo 4 is equal to 3. The wireless device may determine that the redundancy version is 1, for example, if the base station indicates, to the wireless device, a redundancy version indication (e.g., $rv_{id}=1$) via DCI and if n modulo 4 is equal to 0. The wireless device may determine that the redundancy version is 0, for example, if the base station indicates, to the wireless device, a redundancy version indication (e.g., $rv_{id}=1$) via DCI and if n modulo 4 is equal to 1. The wireless device may determine that the redundancy version is 2, for example, if the base station indicates, to the wireless device, a redundancy version indication (e.g., $rv_{id}=1$) via DCI and if n modulo 4 is equal to 2. The wireless device may determine that the redundancy version is 3, for example, if the base station indicates, to the wireless device, a redundancy version indication (e.g., $rv_{id}=1$) via DCI and if n modulo 4 is equal to 3 A same rule may be applied/used, for example, for other transmission occasions. The base station may configure the wireless device with a repetition quantity/number of slots. The repetition number/quantity of slots may be eight slots (e.g., the configured pdsch-AggregationFactor is eight slots), for example, as shown in FIG. 19B or any other number of slots. The wireless device may determine the redundancy versions in order of 0, 2, 3, 1, 0, 2, 3, 1 for the eight slots, for example, if the base station indicates to the wireless device a redundancy version indication (e.g., RV=00) via a PDCCH. The time gap between the PDCCH reception and the first slot (e.g., slot 0 shown in FIG. 19B) of a plurality of slots (e.g., the eight slots shown in FIG. 19B) may be indicated by the base station. The time gap may be j number/quantity of symbols, j number/quantity of slots, or any other time gaps.

Semi-persistent scheduling (SPS) may be supported. SPS may be supported in the downlink. A wireless device may be configured with a periodicity of the data transmission using RRC signaling. Activation of SPS may be initiated and/or performed using a PDCCH, such as for dynamic scheduling, for example, scrambled with a CS-RNTI. The PDCCH may send/carry information (e.g., necessary information) in terms of time-frequency resources and/or other parameters. The HARQ process quantity/number may be derived from a time, for example, if the downlink data transmission starts according to a formula. The wireless device may receive downlink data transmission periodically according to an RRC-configured periodicity using the transmission parameters indicated in the PDCCH activating the transmission, for example, based on activation of SPS. The control signaling may be used. Overhead may be reduced, for example, if the control signaling may be used a limited quantity of times (e.g., once, twice, or any other quantity in a duration). The wireless device may continue to monitor the set of candidate PDCCHs for uplink and downlink scheduling commands, for example, based on enabling the SPS. SPS may be performed, for example, for occasional transmission of large amounts of data and/or for HARQ retransmissions that may be dynamically scheduled.

One or more schemes for transmission without a dynamic grant may be supported, for example, in the uplink. A plurality of schemes may differ in the way they may be activated. The plurality of schemes may comprise at least: 1) configured grant type 1, in which an uplink grant is provided by RRC, including activation of the grant, and 2) configured grant type 2, in which the transmission periodicity is provided by RRC and L1/L2 control signaling is used to activate/deactivate the transmission in a similar way as in a downlink case. These two schemes may reduce control signaling overhead, and the latency before uplink data transmission, for example, as no scheduling request-grant cycle is needed prior to data transmission. Configured grant type 1 may set some or all transmission parameters, comprising periodicity, time offset, frequency resources, and/or MCS of possible uplink transmissions, using RRC signaling. The wireless device may start to use the configured grant for transmission in a time instant indicated by the periodicity and time offset, for example, based on receiving the RRC configuration. The time offset may be relative to a particular SFN (e.g., SFN=0). Configured grant type 2 may be similar to downlink SPS. Higher layer signaling (e.g., RRC signaling) may be used to configure the periodicity and PDCCH activation may provide transmission parameters. The wireless device may send (e.g., transmit) according to the preconfigured periodicity based on receiving the activation command, for example, if there is data in the buffer. The wireless device may, similar to configured grant type 1, not send (e.g., not transmit) anything, for example, if there is no data to send (e.g., transmit). No time offset may be required for configured grant type 2. The wireless device may acknowledge the activation/deactivation of configured grant type 2, for example, by sending a MAC control element in the uplink. Multiple wireless devices may be configured with overlapping time-frequency resources in the uplink in the above schemes. The network may differentiate between transmissions from different wireless devices.

A wireless device may receive, from a base station, parameters to semi-statically configure one or more resource allocations. The wireless device may receive, from the base station, parameters (e.g., higher layer parameters such as configuredGrantConfig in BWP-UplinkDedicated information element) that may semi-statically configure PUSCH resource allocation. A PUSCH transmission may correspond to a configured grant. For a first type of transmissions (e.g., type 1 PUSCH transmissions with a configured grant), one or more of the following parameters may be indicated: time domain resource allocation (e.g., timeDomainAllocation) that may provide a row index pointing to an allocated table, indicating a combination of start symbol and length and PUSCH mapping type; frequency domain resource allocation (e.g., frequencyDomainAllocation) for a given resource allocation type; the modulation order, target code rate and TB size (e.g., by mcsAndTBS); quantity/number of DM-RS CDM groups, DM-RS ports, an SRS resource indication and DM-RS sequence initialization; the antenna port value, the bit value for DM-RS sequence initialization, precoding information and quantity/number of layers, an SRS resource indicator; a frequency offset between two frequency hops if frequency hopping is enabled (e.g., frequencyHoppingOffset). For second type of transmissions (e.g., type 2 PUSCH transmissions with a configured grant), the resource allocation may follow a higher layer configuration and a UL grant received on the activation DCI. The wireless device may not send (e.g., transmit) anything via/on the resources configured by RRC (e.g., configuredGrantConfig), for example, if the higher layer did not deliver a TB to send (e.g., transmit) via/on the resources allocated for uplink transmission without a grant.

A wireless device may receive, from a base station, the higher layer parameters indicating a periodicity for a configured grant. The higher layer parameters may comprise a quantity/number of repetitions (e.g., repK) to be used for a sent (e.g., transmitted) TB. The higher layer parameters may comprise a redundancy version (RV) pattern/sequence (e.g., repK-RV) to be used for the repetitions, for example, if repetitions are used. The redundancy version for uplink transmissions with a configured grant may be set to 0, for example, if the parameter indicating the quantity/number of repetitions is not configured. The redundancy version may be associated with a (mod(n−1,4)+1)th value in the configured RV sequence, for example, for an nth transmission occasion among K repetitions, n=1, 2, . . . , K. The wireless device may use a redundancy version on an nth transmission occasion of the TB according to FIG. 19A. The initial transmission of a TB may start at: the first transmission occasion of the K repetitions, for example, if the configured RV sequence is {0,2,3,1}; any of the transmission occasions of the K repetitions that are associated with RV=0, for example, if the configured RV sequence is {0,3,0,3}; any of the transmission occasions of the K repetitions, for example, if the configured RV sequence is {0,0,0,0}, except for the last transmission occasion if K=8. FIG. 19B shows an example in which K=8 repetitions is configured with an RV sequence {0,2,3,1}.

The repetitions may be terminated for any RV sequence. The repetitions may be terminated, for example, after sending (e.g., transmitting) K repetitions. The repetitions may be terminated, for example, at, during, or after the last transmission occasion among the K repetitions within a period P. The repetitions may be terminated, for example, from a starting symbol of the repetition that overlaps with a PUSCH with the same HARQ process scheduled by DCI format 0_0 or 0_1 (e.g., whichever is received first). The wireless device may not be expected to be configured with the time duration for the transmission of K repetitions larger than the time duration derived by the periodicity P. The wireless device may repeat the TB across the repK consecutive slots using the same symbol allocation in at least some of the slots, for example, for Type 1 and Type 2 PUSCH transmissions with a configured grant. The wireless device may repeat the TB across the repK consecutive slots using the same symbol allocation in at least some of the slots, for example, if the wireless device is configured with repK>1.A transmission on a slot allocated for PUSCH may be omitted for multi-slot PUSCH transmission, for example, if the wireless device determines symbols of the slot as downlink symbols (e.g., according to its procedure for determining a slot configuration).

A PUSCH occasion for a random access procedure (e.g., two-step RACH procedure) may be defined as the time-frequency resource for payload transmission of first message (e.g., MsgA). PUSCH occasions may be separately configured from PRACH occasions. A wireless device may receive a message (e.g., SIB or RRC), for example, comprising PUSCH occasion configuration IE and PRACH occasion configuration IE. A wireless device may derive a PUSCH occasion, for example, based on reusing the resource allocation for configured grant. A PUSCH occasion may be derived, for example, based on other configurations (e.g., reusing semi-static slot format indicator (SFI) plus BWP, reusing PRACH occasion configuration, etc.). The PRACH occasion (e.g., MsgA RO) and the PUSCH occasion (e.g., MsgA PO) for MsgA transmission may be associated/ mapped. A base station may send (e.g., transmit), to the wireless device, a message specifying/configuring a mapping ratio between MsgA ROs and MsgA POs. The base station may send (e.g., transmit), to the wireless device, a message specifying/configuring the relative location of the PUSCH occasion with respect to the associated PRACH occasion. The time/frequency relation between PRACH preambles in PRACH occasion(s) and PUSCH occasions may be single specification fixed value. The time/frequency relation between at least some PRACH preamble in PRACH occasion(s) to the PUSCH occasion may be single specification fixed value. Different preambles in different PRACH occasions may have different values. The time/frequency relation between PRACH preambles in PRACH occasion(s) and PUSCH occasions may be single semi-statically configured value. The time/frequency relation between at least some PRACH preamble in PRACH occasion(s) to the PUSCH occasion may be semi-statically configured value. Different preambles in different PRACH occasions may have different values. The time and frequency relation may follow different alternatives.

A PRACH preamble and a PUSCH resource may be mapped. The PUSCH resource may comprise, for example, time (e.g., in terms of OFDM symbol, slot number, subframe number, and/or SFN), frequency (e.g., frequency index and/or frequency offset), and/or code (e.g., DM-RS port(s) and/or sequence(s)) resources. The mapping between preamble and PUSCH resources (or PUSCH DM-RS resource) may be 1-to-1, multiple-to-1, and/or 1-to-multiple. A PUSCH resource unit for two-step RACH may be defined as the PUSCH occasion and DM-RS port and/or sequence used for a transmission (e.g., a MsgA payload transmission). A configurable quantity/number of preambles (e.g., one or multiple) may be mapped to one or more PUSCH resource units. Both DFT-s-OFDM and CP-OFDM may be supported for a transmission (e.g., payload transmission in MsgA). A guard time may be configured between PRACH occasion and PUSCH occasion in a message (e.g., MsgA). A guard period may be configured within a PUSCH occasion. A guard band may be configured between PRACH and PUSCH in the message (e.g., MsgA). PRACH occasion and PUSCH occasion for a transmission (e.g., MsgA transmission) may be in different slots. The numerology for a transmission (e.g., MsgA PUSCH) may follow the numerology configured for the UL BWP (e.g., initial UL BWP or active UL BWP). PRACH occasion and PUSCH occasion for a transmission (e.g., a MsgA transmission) may be in the same slot. The numerology for MsgA PUSCH may follow MsgA preamble numerology at least for some cases (e.g., short preambles); or the base station may configure whether the numerology for MsgA PUSCH follows that of MsgA preamble or UL BWP; or a wireless device may not be expected to be configured with different numerology among PRACH preamble, MsgA PUSCH, and UL BWP for MsgA transmission.

One or more PUSCH occasions may be configured within a PUSCH configuration period (e.g., a MsgA PUSCH configuration period). The PUSCH configuration period (e.g., MsgA PUSCH configuration period) may or may not be the same as PRACH configuration period, for example, for separate configuration of PRACH occasions and PUSCH occasions. The PUSCH configuration period (e.g., MsgA PUSCH configuration period) may be the same as PRACH configuration period, for example, for relative configuration of PUSCH occasions with respect to PRACH occasions.

Separate PRACH occasions may be configured for different random access procedures. For example, separate PRACH occasions may be configured for a two-step RACH procedure and a four-step RACH procedure. Shared PRACH occasions and separate preambles may be configured for a two-step RACH procedure and a four-step RACH procedure. Shared PRACH occasions and shared preambles may be configured for a two-step RACH procedure and four-step RACH procedure. A message (e.g., MsgA) may support one or more formats. For example, a message may support some or all the preamble formats specified for 3GPP NR (e.g., Release 15) and/or any other generation, release, or access technology.

A beam association rule may be used. A beam association rule that may be used between an SSB and a PRACH occasion of a four-step RACH procedure may be used for a two-step RACH procedure (or any other random access procedure) The MsgA PRACH and MsgA PUSCH may use the same transmit beam (e.g., the same spatial filter). The MsgA PRACH and MsgA PUSCH may use the same or different transmit beam (e.g., the same or different spatial filter) up to the wireless device implementation (e.g., as in a four-step RACH procedure where the beams for Msg1 and Msg3 may be determined according to different wireless device implementations). The MsgA PRACH and MsgA PUSCH may use same or different transmit beam (e.g., the same or different spatial filter), for example, under network control/assistance.

Power control parameters associated with a preamble may be configured for different random access procedures. For example, power control parameters associated with a preamble may be separately configured for a two-step RACH procedure and a four-step RACH procedure. The power control parameters of a two-step RACH preamble may correspond to those of a four-step RACH preamble. Open loop power control may be applied/used for a PUSCH transmission in a message (e.g., MsgA). A power offset relative to the preamble received target power may be configured (e.g., for determination of the PUSCH transmit power). An offset relative to a PRACH transmission power (e.g., a MsgA PRACH transmission power) for a PUSCH transmission power (e.g., a MsgA PUSCH transmission power) may be configured for a random access procedure (e.g., a two-step RACH procedure).

A PUSCH transmission may be configuration with repetitions. For example, a MsgA PUSCH may be configured with repetitions. A MsgA PUSCH may comprise UCI, for example, if a PUCCH transmission overlaps the PUSCH part of the MsgA. The payload size may be dynamically adapted and indicated by the UCI in the MsgA PUSCH. The payload size may vary, for example, which may depend on a particular use/service/application and/or a resource utilization.

A retransmission (e.g., a MsgA retransmission) may comprise a PRACH transmission and a PUSCH transmission. For example, an uplink transmission of a two-step RACH procedure (e.g., MsgA transmission) may refer to a retransmission of a preamble of the two-step RACH procedure (e.g., MsgA PRACH transmission with a re-selection of preamble) and/or a payload of the two-step RACH procedure (e.g., MsgA PUSCH transmission). The wireless device may use the same or different payload for a MsgA PUSCH transmission if resending (e.g., retransmitting) MsgA. The wireless device may fall back from a two-step RACH procedure to a four-step RACH procedure, for example, if a maximum quantity/number of MsgA retransmissions are met. The wireless device may resend (e.g., retransmit) the PUSCH, for example, if the MsgA transmission fails, or if the MsgA PUSCH transmission fails and the MsgA preamble is successfully sent (e.g., transmitted) and decoded by the base station. The wireless device may resend (e.g., retransmit) the PRACH, for example, if the MsgA transmission fails, or if the MsgA PRACH transmission fails and the MsgA PUSCH is successfully sent (e.g., transmitted) and decoded by the base station. A network response to the uplink transmission of the two-step RACH procedure (e.g., MsgA) may comprise a downlink transmission of the two-step RACH procedure (e.g., MsgB) and/or a downlink transmission of a four-step RACH procedure (e.g., Msg2). The network response to the uplink transmission of the two-step RACH procedure (e.g., MsgA) may comprise one or more of the following: a successRAR; a fallbackRAR; and/or a backoff indication. The successRAR may comprise one or more of: a contention resolution ID; a C-RNTI; and/or a TA command. The fallbackRAR may be identical to (or substantially similar to) Msg2. The wireless device may proceed to Msg3 step of a four-step RACH procedure, for example, based on receiving the fallbackRAR. The fallbackRAR may comprise one or more of the following: a RAPID; a UL grant for retransmission of MsgA payload; a TC-RNTI; and/or TA command.

A PUSCH configuration may comprise a plurality of parameters. For example a PUSCH configuration (such as a MsgA PUSCH configuration) may comprise one or more of the following parameters: an MCS and/or a TBS; a quantity/number of FDMed PUSCH occasions (POs), wherein POs (e.g., including guard band and/or guard period, if existing) under the same MsgA PUSCH configuration may be consecutive in frequency domain; a quantity/number of TDMed POs; a quantity/number of PRBs per PO; a quantity/number of DM-RS symbols/ports/sequences per PO; a quantity/number of repetitions for MsgA PUSCH (if configured); a bandwidth of PRB level guard band and/or duration of guard time; a PUSCH mapping type. A MsgA PUSCH configuration, such as a MsgA PUSCH configuration with separate configuration from MsgA PRACH, may comprise one or more of the following parameters: a periodicity (e.g., MsgA PUSCH configuration period); an offset(s) (e.g., symbol, slot, subframe, etc.); a time domain resource allocation (e.g., in a slot for MsgA PUSCH: starting symbol, a quantity/number of symbols per PO, a quantity/number of time-domain POs, etc.); and/or a frequency starting point. A MsgA PUSCH configuration, such as a MsgA PUSCH with relative configuration with respect to MsgA PRACH, may comprise one or more of the following parameters: a time offset (e.g., a combination of slot-level and symbol-level indication) with respect to a reference point (e.g., a start or an end of each PRACH slot); a quantity/number of symbols per PO (e.g., explicit or implicit indication); and/or a frequency offset with respect to a reference point (e.g., start of the first RO or an end of the last RO in frequency domain). One or multiple MsgA PUSCH configurations may be provided to the wireless device. The frequency resource of a MsgA PUSCH may be limited, for example, to the bandwidth of MsgA PRACH.

The wireless device may fall back from a first random access procedure to a fallback random access procedure (e.g., a 4-step RACH procedure). The wireless device may fall back to 4-step RACH, for example, after a time. The wireless device may monitor a PDCCH addressed to C-RNTI for success response and/or MsgB-RNTI (e.g., for MsgA with C-RNTI). The MsgB-RNTI may be RA-RNTI or new RNTI (e.g., pre-defined). The wireless device may determine/consider a contention resolution as successful and/or may stop a reception of MsgB, for example, if the wireless device receives PDU PDCCH addressed to the C-RNTI. The PDU PDCCH may comprise, for example, a TA command. The wireless device may stop the monitoring of PDCCH addressed to the C-RNTI for success RAR, for example, if the wireless device receives/detects a fallback RAR. The wireless device may process the fallback operation, based on receiving/detecting a fallback RAR. The wireless device may proceed to Msg3 step of 4-step RACH procedure. The wireless device may determine/consider the MsgA attempt failed, for example, if no fallback RAR and/or no success RAR (e.g., PDCCH addressed to C-RNTI) is detected within the RAR monitoring window. The wireless device may perform a backoff operation based on a backoff indicator. The received MsgB may comprise the backoff indicator. A network response to MsgA (e.g., Msg2/MsgB) may comprise one or more of: a success RAR; a fallback RAR; and/or a backoff indication. The success RAR may comprise one or more of: a contention resolution identifier; a C-RNTI; and/or a TA-command. The fallback RAR may comprise one or more of: a RAPID; a Ul grant; a TC-RNTI; and/or a TA command.

A RACH may occupy one or more time domain resources (e.g., subframes/slots) for random access preamble transmissions. The RACH may occupy, for example, one or more consecutive subframes/slots for a quantity/number of PRACH repetitions for preamble transmission. A quantity/number of PRACH repetitions for a preamble transmission attempt may be indicated by higher layers, for example, in a coverage enhancement deployment (e.g., bandwidth reduced low complexity coverage enhancement: BL/CE) and/or NB-IoT deployment. A base station may send (e.g., transmit, broadcast/multicast/unicast), for example, one or messages comprising configuration parameters of an RA procedure. The configuration parameters may indicate a repetition factor (e.g., a quantity/number of repetitions) for the preamble transmission. The preamble transmission with the quantity/number of repetitions may result in an increased accumulated received power/signal strength at the base station. The base station may be able to successfully receive the preamble with higher probability from a wireless device (e.g., an edge wireless device with increased pathloss), for example, if the wireless device sends (e.g., transmits) the preamble with repetitions.

PRACH resources may be provided to a wireless device. A set of PRACH resources (e.g., time, frequency, preamble), at least some associated with a coverage enhancement level, may be provided to the wireless device (e.g., in SIB). The quantity/number of PRACH repetitions per coverage enhancement level may be provided in a SIB. Wireless devices in a same coverage enhancement level may use random access resources associated with the same coverage enhancement level. Time/frequency resources and the repetition factor for RAR messages and/or Msg3 for wireless device in coverage enhancement mode may be derived, for example, from the time/frequency resources and the repetition factor of PRACH resources. A single preamble may be sent (e.g., transmitted) for the quantity/number of PRACH repetitions based on the associated PRACH coverage enhancement level, for example, as indicated by higher layers. A set of PRACH resources, at least some associated with a coverage enhancement level, may be provided to the wireless device. The PRACH resources may be FDMed, for example, such that each FDMed PRACH occasion may be mapped to one coverage enhancement level. Different preamble groups may be mapped, for example, to different coverage enhancement levels.

A mapping of PRACH resources to coverage enhancement levels may be determined. A mapping of PRACH resources to coverage enhancement levels may be determined, for example, based on a received signal strength (e.g., RSRP) of a downlink reference signal. A quantity/number of enhanced coverage levels may be based on a quantity/number of RSRP thresholds. For example, the quantity/number of enhanced coverage levels may be equal to one plus a quantity/number of RSRP thresholds. The RSRP thresholds may be provided in one or more RRC messages and/or SIB Enhanced coverage levels may be numbered/identified starting from 0 or any other value. The mapping of PRACH resources to enhanced coverage levels may be in an increasing order of quantity/number of repetitions per preamble attempt. The wireless device may select PRACH resources based on RSRP measurement per enhanced coverage level (e.g., the selection criteria may be indicated by the one or more RRC messages and/or SIB). A quantity/number of repetitions for preamble transmission per attempt for each enhanced coverage level may be indicated in the one or more RRC messages and/or SIB. An RAR window size and/or a contention resolution window size per enhanced coverage level may be indicated.

An RAR may indicate a quantity number of repetitions. For example, a quantity/number of Msg3 PUSCH repetitions may be indicated in the RAR. Contents of the RAR (e.g., field sizes) may be determined/interpreted based on a coverage enhancement level of the wireless device. The RAR may comprise a repetition quantity/number field may indicate a repetition level for an initial transmission of Msg3 PUSCH. The repetition level may be based on the enhanced coverage level.

One or more repetition levels used for transmissions with repetitions of a TB may be configured. One or more repetition levels used for transmissions with repetitions of a TB may be configured, for example, by a base station. A wireless device may select a first repetition level from the one or more repetition levels based on its estimate of its coverage condition based on DL measurements (e.g., RSRP, RSRQ, etc.). A redundancy version may be maintained the same and/or be cycled every set of subframes/slots for the repetitions.

Repetitions may be sent (e.g., transmitted) using predefined gaps in the time domain. Including predefined gaps in the time domain may allow the wireless device to monitor for a positive ACK from the base station. The wireless device may terminate transmissions, for example, if an ACK is received. The wireless device terminating transmissions may save power and/or reduce interference level in the system. The wireless device may continue to perform multiple attempts or retransmissions, for example, at least until an ACK is received. The transmission characteristics (e.g., RV, MCS, repetition level) may be adjusted for some or all sets of K attempts according to an adaptive retransmission scheme. K may be a predefined or configured parameter (e.g., configured by the base station on a per coverage level basis). The repetition level may be increased every K attempts, for example, which may improve the robustness and link-budget of subsequent transmission attempts. The wireless device may determine a lower MCS index (or level) and/or larger size of resource(s) for retransmission, for example, which may improve the link-budget.

A wireless device may generate a random access message (e.g., a MsgA for a two-step RACH procedure). The random access message may comprise a preamble portion (e.g., MsgA PRACH) and a data portion (e.g., MsgA PUSCH). The preamble portion may comprise one or more repeated preambles constructed using a same sequence, and/or a CP that precedes repeated preamble sequences. The data portion may comprise one or more data segments, at least some data segments including a quantity/number of repeated data symbols and/or a CP that may precede the repeated data symbols. A wireless device-ID may be included in the data portion.

A burst of a transmission may be allocated to form an occasion burst. For example, a burst of a MsgA transmission occasions may be allocated together in a time-domain to form a MsgA occasion burst. A burst of MsgA transmission occasions may be allocated to form a MsgA occasion burst, for example, to increase transmission opportunities One or more transmission opportunities may be associated with a probability of listen-before-talk (LBT) failure at each MsgA transmission occasion. A burst of MsgA occasions may be available for MsgA transmissions. Some or all of the MsgA occasions of the burst of MsgA occasions may correspond to a same SS/PBCH block or different SS/PBCH blocks. A wireless device detecting the SS/PBCH block may be associated with PRACH resources on a MsgA occasion burst basis (e.g., multiple MsgA transmission occasions may be allowed within a MsgA occasion burst). The wireless device may send (e.g., transmit) a MsgA, for example, within a configured MsgA occasion burst. The wireless device may send (e.g., transmit) at most one (or another quantity of) MsgA, for example, within a configured MsgA occasion burst. The wireless device may not send (e.g., transmit) in MsgA occasions after a MsgA transmission. The wireless device may attempt to send (e.g., transmit) in every MsgA occasion, for example, within a MsgA occasion burst. The wireless device may select the same preamble sequence or different preamble sequences, for example, across the burst of MsgA occasions.

An RAR window may be used after a wireless device sends (e.g., transmits) a first message (e.g., MsgA). A single RAR window may be used after a wireless device sends (e.g., transmits) a first MsgA, for example, if multiple MsgA transmission occasions are allowed within a MsgA occasion burst. The wireless device may start to attempt to receive the RAR message within the RAR window, for example, based on the first successful MsgA occasion (e.g., successful LBT in NR-U). The wireless device may send (e.g., transmit) MsgA in other MsgA occasions within the MsgA occasion burst, for example, before the RAR window ends. The base station may send (e.g., transmit) one RAR in one RAR occasion within the single RAR window, or send (e.g., transmit) multiple RAR messages in multiple RAR occasions within the single RAR window. The wireless device may assume a single RAR transmission and may stop monitoring for RAR if the wireless device detects any RAR message for the wireless device. The wireless device may stop monitoring for the RAR, for example, if the wireless device sends (e.g., transmits) a single MsgA and/or if the wireless device sends (e.g., transmits) multiple MsgA within a MsgA occasion burst and monitors a separate RAR window for each sent (e.g., transmitted) MsgA. The wireless device may not monitor for RAR in other window(s), for example, after the wireless device detects a first RAR from one of the monitored RAR windows. The wireless device may (still) monitor for RAR in other RAR window(s). The wireless device may continue to monitor the RAR window for multiple MsgA transmission within a MsgA occasion burst, for example, at least until either the wireless device detects an RAR message that corresponds to its MsgA such that a successful 2-step RACH may be achieved (e.g., success RAR); or the wireless device detects an RAR that corresponds to correct information of preamble and PRACH radio resource, such that a fallback to 4-step RACH is available; or the end of the RAR window is reached.

A wireless device may be configured (e.g., by a base station) to send (e.g., transmit) repeated preambles for an RA procedure. The wireless device may send (e.g., transmit) a preamble for a quantity/number of preamble repetitions, for example, using a quantity/number of PRACH occasions associated with a selected SSB. The quantity/number of PRACH occasions, for example, may be FDMed and/or TDMed. The wireless device may perform multiple transmissions of a preamble for a quantity/number of MsgA PRACH repetitions as part of a two-step RACH procedure. The wireless device may be configured to send (e.g., transmit) a TB multiple times based on a quantity/number of repetitions (e.g., MsgA PUSCH repetition level/number/factor) using a quantity/number of PUSCH occasions associated with the same SSB, PRACH occasion(s), and/or preamble, for example, for a two-step RACH procedure. The quantity/number of PUSCH occasions, for example, may be FDMed and/or TDMed. The quantity/number of MsgA PRACH repetitions may be the same or different from the quantity/number of MsgA PUSCH repetitions. A wireless device may transmit a TB multiple times, for example, based on a quantity/number of repetitions as part of a RACH-less (RACH-skip) handover.

A base station may configure resources for a transmission with wireless devices. The resources may be common (e.g., shared, cell-specific) resources associated with a random access procedure (e.g., a 2-step RACH procedure). Although resources may be common, a quantity of repetitions for transmission via the resources may not need to be common (e.g., across a cell). At least some wireless devices may not require the same quantity of repetitions as other wireless devices to achieve a successful transmission (e.g., successful MsgA PUSCH transmission in a 2-step RACH procedure), for example, based on different channel conditions, wireless device capabilities, and/or other factors that may differ across wireless devices. Using the same quantity of repetitions for transmissions by each wireless device in a system may result in unnecessary power consumption, collision, network congestion, and/or latency.

As described herein, a wireless device may determine a quantity of repetitions (e.g., MsgA PUSCH repetitions) for a successful transmission (e.g., a MsgA transmission). A wireless device may determine a quantity of repetitions based on a received signal strength of a downlink reference signal and/or other factors. The wireless device may compare a received signal strength of a downlink reference signal to one or more received signal strength thresholds and/or ranges to determine a quantity of repetitions. The quantity of repetitions may be less than (or equal to) a maximum quantity of allowed repetitions. Use of a quantity of repetitions determined in the manner described herein may provide various advantages such as reduced power consumption of the wireless device (e.g., by reducing unnecessary transmission of repetitions), reduced collision (e.g., due to less demand for transmission via common resources), reduced network congestion (e.g., more efficient allocation of resources within a cell), and/or reduced latency (e.g., by early termination of repeated transmissions, and/or by determining an efficient starting time for a monitoring window, such that unnecessary monitoring may be avoided).

A base station may configure resources for a transmission (e.g., a MsgA PUSCH transmission). The resources may be configured as part of a random access procedure (e.g., a 2-step RACH procedure). The resources may be configured for a quantity/number of repetitions (e.g., a repK parameter for configured grants type 1 and/or type 2, a pusch-AggregationFactor for dynamic UL grants, etc.). The resources may be common resources for some or all wireless devices in a cell. At least some wireless devices in the cell may have different channel conditions. At least some wireless devices in the cell may have different channel conditions, for example, if they try sending (e.g., transmitting) a TB with the quantity/number of repetitions for a 2-step RACH procedure and/or RACH-less HO. A base station may be able to successfully receive and decode the transmission (e.g., a MsgA PUSCH) from a first wireless device (e.g., center wireless device, a wireless device in the cell center), for example, with fewer quantity/number of repetitions than a second wireless device (e.g., an edge wireless device, a wireless device at the cell edge). Increased power consumption of the first wireless device, increased interference level in the system, and/or waste of radio resources may result, for example, if the wireless device sends (e.g., transmits) PUSCH repetitions for more than a first quantity/number of repetitions. The base station may be able to allocate a portion of the resources to other wireless devices, for example, if the first wireless device stops sending (e.g., transmitting) PUSCH repetitions at a reasonable time (e.g., not using all the configured resources). A third competing wireless device (e.g., in a contention-based 2-step RACH procedure) may be able to use the rest (e.g., the portion) of the resources, for example, for one or more PUSCH transmissions. The resources may comprise one or more PUSCH occasions associated with one or more downlink reference signals (e.g., SSBs and/or CSI-RSs) and/or one or more PRACH occasions (e.g., 2-step RACH ROs). The resources may comprise one or more DM-RS ports associated with the one or more downlink reference signals (e.g., SSBs and/or CSI-RSs) and/or one or more preambles (e.g., 2-step RACH preambles).

In at least some types of wireless communications, configuration parameters of a group of PUSCH occasions may be common to wireless devices in a cell (e.g., cell-specific). Configuration parameters of a group of PUSCH occasions may be associated with one or more downlink reference signals for a quantity/number of PUSCH transmissions with repetitions as part of random access procedure (e.g., a 2-step RACH procedure). At least some wireless devices may require and/or use different quantities/numbers of PUSCH repetitions for a successful transmission (e.g., successful MsgA transmission), depending on their channel quality and their capabilities. Using a common quantity/number of repetitions for MsgA PUSCH transmission may result in an increased power consumption, an increased latency in the RACH procedure, an increased interference level in the cell, and/or a waste of common resources (e.g., the rest of the transmission occasions in the selected resource) for initial access across the cell, yielding to an increased contention over the common resources.

A wireless device may stop sending (e.g., transmitting) MsgA PUSCH repetitions after a configured or determined (e.g., based on RSRP) quantity/number of repetitions. The wireless device may select resources comprising transmission occasions, for example, based on the configured or determined quantity/number of repetitions. An insufficient received power and/or undecodable/unsuccessful reception of the PUSCH at the base station may result, for example, if the wireless device is moving (e.g., due to channel deterioration and/or increased pathloss).

A wireless device may start an RAR window to monitor for one or more RARs. A wireless device may start an RAR window to monitor for one or more RARs after a last transmission/repetition, for example, if configured with preamble and/or PUSCH repetitions. A wireless device starting an RAR window to monitor for one or more RARs after a last transmission/repetition may result in an increased latency, which may not be necessary, for example, if the wireless device has a good channel condition and the base station successfully receives/decodes the transmission using one or more first transmissions. The base station may be able to send (e.g., transmit) the RAR(s), in such examples, earlier than the last transmission/repetition occasion. As described herein, the wireless device and the base station may start the RAR window earlier than a last transmission/repetition occasion, resulting in a reduced latency of the RA procedure.

A wireless device may start an RAR window to monitor for one or more RARs. A wireless device may start an RAR window to monitor for one or more RARs after a first transmission, for example, if configured with preamble and/or PUSCH repetitions. A wireless device starting an RAR window to monitor for one or more RARs after a first transmission may result in an increased power consumption for unnecessarily early monitoring, for example, if the wireless device has a bad channel condition and is required and/or used to send (e.g., transmit) a large quantity/number of repetitions in order for the base station to successfully receive preamble and/or PUSCH. As described herein, an efficient starting time of the RAR window may be determined for preamble and/or PUSCH repetition. The base station may configure a first quantity/number of repetitions, for example, after which to start the RAR window, wherein the first quantity/number is based on an estimation of a required quantity/number of repetitions of a wireless device with good channel conditions. At least some wireless devices may determine a first quantity/number of repetitions after which to start the RAR window, for example, based on a received signal strength (e.g., RSRP) from one or more SSBs.

A wireless device may determine a quantity/number of repetitions (e.g., PUSCH repetitions) for a transmission (e.g., a MsgA transmission). A wireless device may determine a quantity/number of repetitions for a transmission, for example, based on a received signal strength (e.g., RSRP), such as from one or more SSBs. A wireless device power consumption may be reduced and/or an interference level may be reduced, by avoiding extra transmissions, for example, if a wireless device determines a quantity/number of repetitions for a transmission (e.g., based on a received signal strength). The network may be able to (re)assign/(re)use the rest of the transmission occasions to/for other wireless devices, for example, if the size of the group of PUSCH occasions is large enough for a worst-case example.

A wireless device may re-send/keep sending (e.g., transmitting) a transmission. The wireless device may re-send/keep sending (e.g., transmitting) the transmission, for example, after the configured or determined number of repetitions. A wireless device may re-send/keep sending (e.g., transmitting) a MsgA PUSCH, for example, as long as there are corresponding MsgA PUSCH occasions available. A wireless device may re-send/keep sending (e.g., transmitting) a MsgA PUSCH, for example, until the wireless device receives a response from the base station (e.g., ACK (e.g., success RAR) or NACK (e.g., fallback RAR)). Allocated resources may comprise, for example, one or more of: a fixed quantity/number of transmission occasions, wherein the fixed quantity/number is at least equal to a quantity/number of transmission occasions of a worst-case example. By continuing transmissions until a response is received within a monitoring (e.g., RAR) window, a robustness of MsgA PUSCH transmission and thus the RA procedure may be improved. Continuing transmissions until a response is received within a monitoring (e.g., RAR) window may result in avoiding random access failure, and/or avoiding increased power consumption and latency. As described herein, a quantity/number of repetitions based on a received signal strength may be determined and used for a transmission. By using a quantity of repetitions based on a received signal strength, various advantages may result, such as: enhanced power consumption of a wireless device, more efficient quantity/number of repetitions transmitted such that extra resources may be used/reused by the network for other wireless devices, and/or reduced RA latency by determining an effective starting time of the RAR window for monitoring such that unnecessary monitoring may be avoided A wireless device may receive from a base station one or more messages (e.g., RRC messages and/or SIB). The one or more messages (e.g., RRC messages and/or SIB) may comprise configuration parameters of resources for MsgA transmission (e.g., for a contention-free (CF) and/or contention-based (CB) 2-step RACH procedure). The resources may indicate a pool of time domain resources (e.g., slots/symbols/subframes) and frequency domain resources (e.g., BWPs, subbands/resource blocks/PRBs). The resources may comprise a plurality of ROs. The plurality of ROs may be FDMed and/or TDMed. The configuration parameters may indicate for the plurality of ROs: a period, slots/subframes and time offsets (symbols), a quantity/number of symbols per RO, frequency domain resources, a starting frequency resource, a quantity/number of FDMed ROs per time instance, a quantity/number of preambles mapped to a RO, a quantity/number of consecutive ROs (e.g., ordered first in frequency domain next in time domain) mapped to one SSB/CSI-RS or vice versa (e.g., a mapping ratio), PRACH transmission power control parameters, a preamble repetition quantity/number, etc. The resources may comprise a plurality of POs. The plurality of POs may be FDMed and/or TDMed. The configuration parameters may indicate for the plurality of POs: a period, slots/subframes and time offsets (symbols), a quantity/number of symbols per PO, frequency domain resources, a starting frequency resource, a quantity/number of FDMed POs per time instance, a quantity/number of consecutive POs (ordered first in frequency domain next in time domain) mapped to one SSB/CSI-RS or vice versa (e.g., a mapping ratio), PUSCH transmission power control parameters, a quantity/number of DM-RS ports/sequences per PO (e.g., a mapping ratio), a quantity/number of POs and/or DM-RS ports/sequences mapped to one SSB/CSI-RS or vice versa (e.g., a mapping ratio), a quantity/number of POs and/or DM-RS ports/sequences mapped to one RO/preamble or vice versa (e.g., a mapping ratio), a PUSCH repetition quantity/number, etc. The plurality of ROs and the plurality of POs may be configured with a same or different period for a burst of MsgA transmission occasions.

Figure 20A:
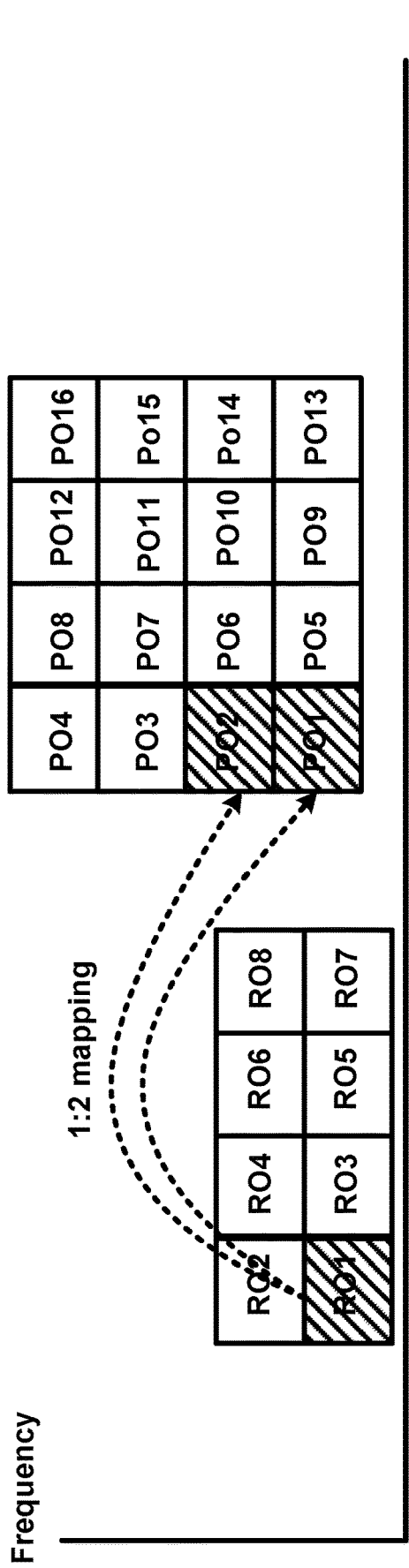
FIG. 20A and FIG. 20B show examples of resource allocation mapping for a message.
Figure 20B:
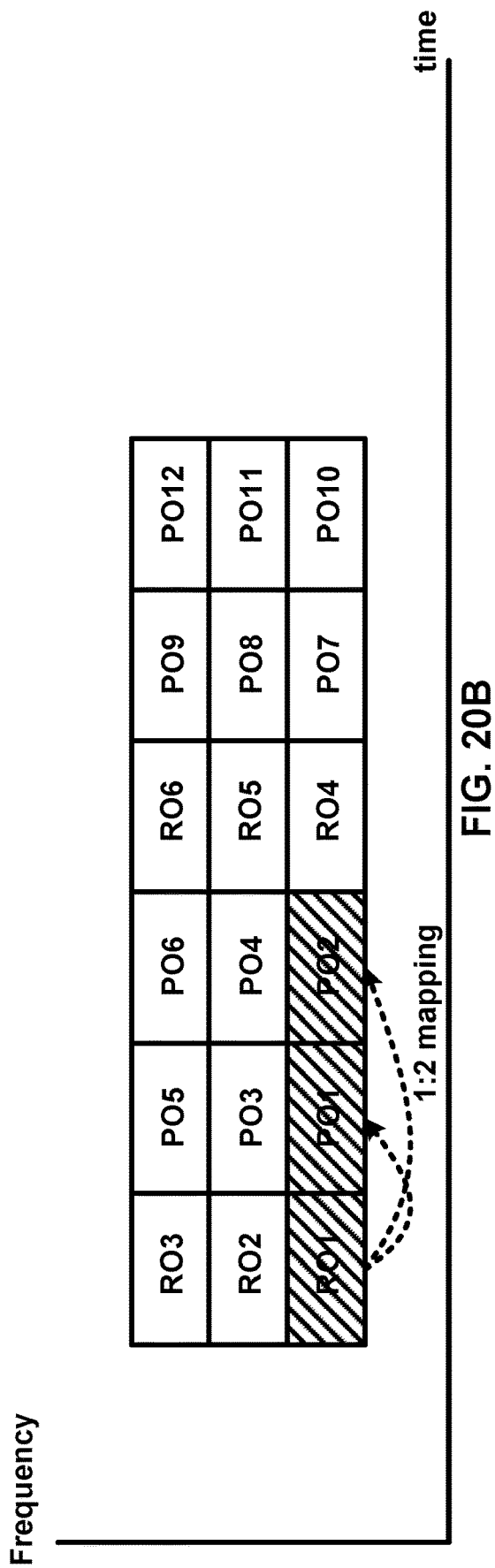

FIG. 20A and FIG. 20B show examples of resource allocation mapping for a message. Resource allocation for MsgA may be indicated by a mapping of MsgA PRACH occasions to MsgA PUSCH occasions. One or more POs may be mapped to one or more ROs. FIG. 20A shows an example 1:2 mapping where one RO is mapped to 2 POs. The associated PO(s) and RO(s) may be mapped to one or more SSBs/CSI-RSs. The associated RO(s) and PO(s) may be TDMed and may not overlap in time domain. One or more POs may follow, for example, the associated one or more ROs. FIG. 20B shows an example of 1:2 mapping where the RO and the associated POs are TDMed. The figures may correspond to one burst/period of MsgA transmission occasions.

A group of ROs may be configured for one or more repetitions of a preamble transmission as part of a random access procedure (e.g., a two-step RACH procedure). A group of POs may be configured for one or more repetitions of a TB transmission as part of a random access procedure (e.g., a two-step RACH procedure). The group of ROs may be mapped to the group of POs for a MsgA transmission with preamble and/or PUSCH repetition. The associated group of ROs and POs may be mapped to the same SSB(s)/CSI-RS(s). The ROs/POs within the group of ROs/POs may be allocated in consecutive slots (e.g., using same symbol allocation), or may be consecutive ROs/POs in the plurality of ROs/POs configured in the pool of resources (e.g., ordered first in frequency domain next in time domain). The ROs and POs of the associated group of ROs and POs may be located one after another. The ROs and POs of the associated group of ROs and POs may be mapped to each other one by one. One PO may be mapped, for example, to one RO. The RO and PO may be TDMed (e.g., RO followed by PO) as one MsgA transmission occasion, and the next associated MsgA transmission occasion may be located in a next slot/subframe/period.

FIG. 21A, FIG. 21B, and FIG. 21C show examples of resource allocation for a message using a repetition. The resource allocation may be for a MsgA with PRACH repetition and/or PUSCH repetition. FIG. 21A shows, for example, a group of two ROs allocated for a preamble transmission with up to two repetitions, and the associated group of four POs allocated for a TB transmission with up to four repetitions. The ROs/POs are configured for slot repetition, for example, in which the same resources may be allocated in consecutive slots. The ROs/POs may not be configured for consecutive slot repetition. Mapping of ROs for a preamble transmission to POs for a TB transmission, for example, may be different (e.g., 1:2, 1:3, 1:4). Transmission occasions (e.g., ROs and/or POs) for repetitions may not be allocated in different slots. Transmission occasions (ROs and/or POs) for repetitions, for example, may be FDMed. FIG. 21B shows, for example, one RO (e.g., no preamble repetition) followed by an associated group of five POs for up to five PUSCH repetitions. FIG. 21C shows, for example, a MsgA transmission occasion with two ROs and two POs where one RO is followed by one PO, followed by a second RO, followed by a second PO. Some or all associated ROs and POs of a MsgA transmission occasion may be mapped to the same SSB/CSI-RS and/or different SSBs/CSI-RSs.

As described herein, an improved RA procedure may use PUSCH repetition. A 2-step RACH, for example, may use MsgA PUSCH repetition and/or a RACH-less handover with PUSCH repetition. A wireless device may determine a quantity/number of repetitions for PUSCH transmissions (e.g., MsgA PUSCH repetition factor). A wireless device may determine a quantity of repetitions for MsgA PUSCH transmissions, for example, based on a received signal strength of at least one downlink reference signal (e.g., SSB or SCI-RS).

The wireless device may select the at least one downlink reference signal from a plurality of downlink reference signals. The wireless device may select the at least one downlink reference signal from a plurality of downlink reference signals, for example, based on received signal strengths (e.g., RSRP) of the plurality of downlink reference signals. An RSRP of the at least one downlink reference signal, for example, may be greater/higher than a first value. The configuration parameters may comprise the first value. The first value may be predefined.

The wireless device may select one or more ROs associated with the at least one downlink reference signal. The wireless device may select one or more groups of ROs associated with the at least one downlink reference signal, for example, if configured with preamble repetition for the transmission of MsgA PRACH. At least some group of ROs may comprise Q ROs. The configuration parameters may indicate the value Q. The Q ROs may be FDMed and/or TDMed. The Q ROs may be in consecutive slots. The wireless device may select one or more POs associated with the at least one downlink reference signal. The wireless device may select one or more groups of POs associated with the at least one downlink reference signal, for example, if configured with TB repetition for the transmission of MsgA PUSCH. At least some group of POs may comprise R POs. The configuration parameters may indicate the value R. The R POs may be FDMed and or TDMed. The R POs may be in consecutive slots. The selected one or more groups of POs may be mapped to the selected one or more ROs.

The configuration parameters may indicate one or more signal strength thresholds (e.g., RSRP thresholds) and/or signal strength ranges. MsgA PUSCH repetition factors (e.g., a quantity/number of MsgA PUSCH repetitions) may be mapped to ranges of a received signal strength (e.g., RSRP) of a downlink reference signal. A mapping of MsgA PUSCH repetition factors to coverage enhancement levels may be determined based on the received signal strength. A quantity/number of enhanced coverage levels may be equal, for example, to one plus a quantity/number of RSRP thresholds. The RSRP thresholds may be provided in one or more RRC messages and/or SIB. Enhanced coverage levels may be numbered from 0. The mapping of MsgA PUSCH repetition factor to enhanced coverage levels may be done in an increasing order of quantity/number of repetitions per MsgA PUSCH attempt.

Figures 22A, 22B:
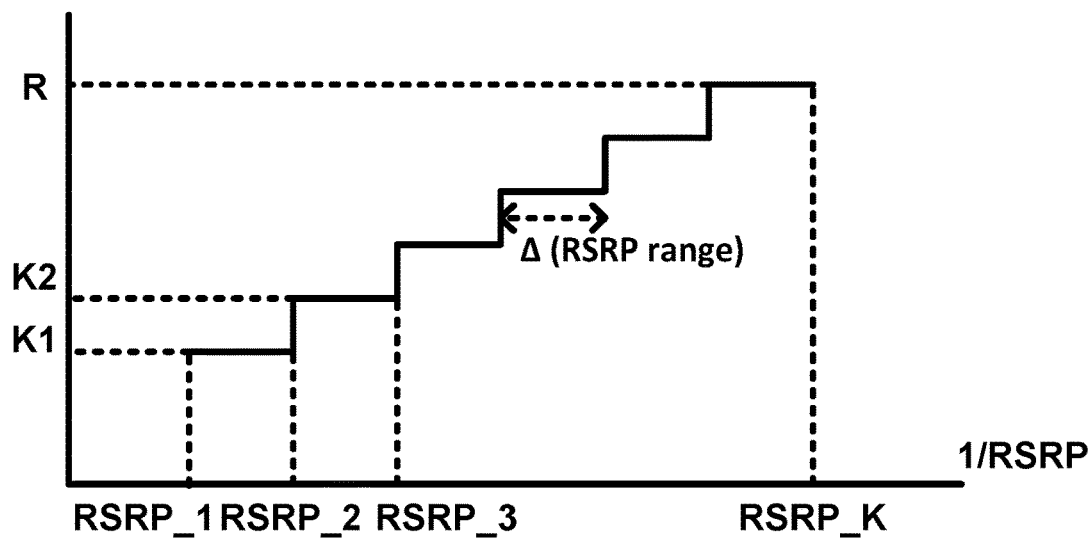
FIG. 22A and FIG. 22B show examples for mapping a message repetition factor to a received signal strength.

FIG. 22A and FIG. 22B show examples for mapping a message repetition factor to a received signal strength. A MsgA PUSCH repetition factor may be mapped to a received signal strength. FIG. 22A shows, for example, mapping MsgA PUSCH repetition factors to RSRPs. Each range of RSRP may be mapped to a MsgA repetition factor (K). A group of POs may be configured, for example, for MsgA transmission with up to R repetitions. The wireless device may determine K between a value, K1, and up to R, based on the RSRP. K1 may be indicated via the configuration parameters. K1 may be 1. K1 may be predefined. The configuration parameters may indicate one or more RSRP thresholds. Any quantity of repetition factors may be mapped to any quantity of RSRP values. The wireless device may determine ranges of RSRPs, for example, between at least some of two consecutive RSRP thresholds. The configuration parameters, for example, may provide the limits (RSRP_1 and RSRP_K) and a length for each RSRP range (Δ). The wireless device may determine ranges of RSRPs by dividing the interval from RSRP_1 to RSRP_K by the RSRP range Δ. The ranges of RSRPs may be indexed in an increasing order, as the average/first/last value of RSRP decreases. The values of K may be ordered in an increasing order from K1 to R. The quantity/number of RSRP ranges may be equal to the values of K. The wireless device may map each range of RSRP to a value of K in an increasing order of indexes of RSRPs and values of K, for example, as illustrated in FIG. 22A. FIG. 22B show, for example, a table representing the RSRP to repetition factor mapping, based on the mechanism as described above in this paragraph.

The wireless device may select one or more ROs. The wireless device may select a preamble associated with the at least one downlink reference signal. The wireless device may select one or more ROs and a preamble associated with the at least one downlink reference signal, for example, based on selecting the at least one downlink reference signal. The wireless device may select, from one or more groups of PUSCH occasions associated with the at least one downlink reference signal, the one or more ROs, and/or the preamble, at least one PUSCH occasion group. The at least one PUSCH occasion group may comprise at least K POs. The wireless device may select one or more DM-RS ports/sequences of the at least one PUSCH occasion group associated with the at least one downlink reference signal and/or the preamble.

The wireless device may select a PO group (e.g., a burst of PUSCH transmission occasions). The PO group may comprise R POs. R may be a fixed parameter. R may be a resource allocation parameter, for example, indicated by the configuration parameters. R may be a predefined parameter, for example, for determining groups of POs from a pool of resources. The wireless device may send (e.g., transmit) a TB (e.g., the data of the 2-step RACH MsgA and/or RACH-less handover) via the PO group for at least the determined quantity/number of repetitions (K times/repetitions). The wireless device may send (e.g., transmit) a TB (e.g., the data of the 2-step RACH MsgA and/or RACH-less handover) via the PO group, for example, based on selecting the PO group. The wireless device may send (e.g., transmit) the TB, for example, at least via the first K POs of the PO group. The first K POs, for example, may be valid (e.g., may not overlap with DL and/or SSB symbols). The wireless device may send (e.g., transmit) the preamble via the selected one or more ROs associated with the selected PO group and/or the at least one downlink reference signal. The wireless device may send (e.g., transmit) the preamble with a second quantity/number of repetitions. The second quantity/number of repetitions may or may not be equal to the quantity/number of repetitions (e.g., K) for PUSCH.

The wireless device may stop sending (e.g., transmitting) the TB. The wireless device may stop sending (e.g., transmitting) the TB, for example, after the quantity/number of repetitions (K) is reached. A base station may not know a quantity/number of repetitions that a wireless device may have used in advance. The quantity/number of repetitions (K) may be selected based on a RSRP of a wireless device. The base station may attempt to decode one or more PUSCH repetitions from the wireless device based on one or more candidate repetition quantities/numbers. A quantity/number of repetitions are indicated for different RSRP values as shown in FIG. 22B. The base station may attempt to decode, for example, K1 repetitions, K2 repetitions, . . . , and R repetitions from the wireless device.

The wireless device may continue sending (e.g., transmitting) the TB. The wireless device may continue sending (e.g., transmitting) the TB, for example, after the K repetitions. The wireless device may start monitoring a response (e.g., an RAR), for example, after the K repetitions. The wireless device may stop repetitions based on receiving a successful response.

The configuration parameters may indicate one or more PDCCHs for receiving one or more RARs. The configuration parameters may indicate at least one control resource set (CORESET) of the PDCCHs, at least some CORESET comprising one or more monitoring occasions. At least some monitoring occasion may be comprised of one or more resource blocks and one or more symbols. The configuration parameters may comprise one or more durations of one or more monitoring windows (e.g., RAR window) for receiving the one or more RARs. The one or more durations may be in quantity/number of subframes/slots/symbols. The configuration parameters may comprise one or more time offsets with respect to one or more monitoring occasions for starting the monitoring window. The one or more time offsets may be predefined. The configuration parameters may comprise one or more RNTIs for receiving one or more RARs. The one or more RNTIs may be predefined. A CRC of at least some of the one or more RARs be scrambled with the one or more RNTIs.

The one or more RARs (e.g., Msg2 or MsgB) may comprise a success-RAR and/or a fallback-RAR. The one or more RARs may be scrambled/masked with a C-RNTI, RA-RNTI, MsgB-RNTI, and/or another RNTI (e.g., predefined). The wireless device may detect a PDCCH addressed to the C-RNTI for a success-RAR (e.g., ACK) for the monitoring window. The wireless device may detect a PDCCH addressed to the C-RNTI for a success-RAR (e.g., ACK) for the monitoring window, for example, if the wireless device is in RRC CONNECTED (e.g., a C-RNTI is available to the wireless device). The wireless device may detect a PDCCH addressed to the RA-RNTI for a success-RAR for an RAR monitoring window (e.g., the monitoring window), for example, if a C-RNTI may not be available to the wireless. The success-RAR may comprise a TA command. The success RAR may comprise a scheduling information where the wireless device may locate a contention resolution message or may comprise a contention resolution information (e.g., contention resolution ID).

The wireless device may detect a PDCCH transmission. For example, the wireless device may detect a PDCCH transmission addressed to the MsgB-RNTI (e.g., RA-RNTI, etc.) in the monitoring window for a fallback-RAR. The fallback-RAR may comprise one or more preamble IDs (e.g., RAPIDs), one or more UL grants, one or more TC-RNTIs, and/or TA command. The fallback-RAR may be based on an existing RAR format, for example, used in a four-step RACH procedure. The wireless device may detect the success-RAR comprising the RAPID of the sent (e.g., transmitted) preamble by the wireless device. The wireless device may detect a response based on the C-RNTI of the wireless device, which the wireless device may consider as a success-RAR/ACK. Detection by the wireless device of a response based on the C-RNTI of the wireless device may be determined/considered as a completion of a RACH procedure or acknowledgement of the sent (e.g., transmitted) preamble. The wireless device may stop transmission of one or more repetitions of MsgA PUSCH as MsgA PUSCH has been successfully received. The wireless device may determine that MsgA PUSCH has not been received successfully, for example, if the wireless device detects the fallback-RAR. The wireless device may continue transmission of MsgA PUSCH repetitions or may stop MsgA PUSCH repetition. The wireless device may resend (e.g., retransmit) a MsgA PUSCH based on scheduling information indicated in the fallback-RAR, for example, if the wireless device stops MsgA PUSCH repetition. The wireless device may continue MsgA PUSCH repetition, for example, if the fallback-RAR indicates a same resource set used in the MsgA PUSCH repetition or the fallback-RAR indicates to continue the MsgA PUSCH repetition. The wireless device may determine/consider the following case as a NACK on the MsgA PUSCH repetition or a failure of the preamble transmission: the wireless device does not detect a fallback-RAR or a success-RAR for the monitoring window; the wireless device does not detect any success-RAR and detects one or more fallback-RARs that do not comprise the RAPID of the sent (e.g., transmitted) preamble; and/or the wireless device does not detect any fallback-RAR and detects one or more success-RARs that do not comprise the RAPID of the sent (e.g., transmitted) preamble.

The wireless device may continue MsgA PUSCH repetition. The wireless device may stop MsgA PUSCH repetition. The wireless device may resend (e.g., retransmit) a preamble with a PUSCH repetitions. The wireless device may continue MsgA PUSCH repetition, may stop MsgA PUSCH repetition, and/or may resend (e.g., retransmit) a preamble with a PUSCH repetitions, for example, if the wireless device determines the NACK on the MsgA PUSCH repetition or the failure of the preamble transmission. The fallback-RAR may comprise one or more UL grants for re-transmission of the TB, and/or a TC-RNTI. The wireless device may stop monitoring the PDCCH based on receiving one or more RARs for the monitoring window. The wireless device may continue monitoring the PDCCH until an end of the monitoring window, for example, based on not receiving the one or more RARs. The wireless device may not detect a PDCCH addressed to the C-RNTI and/or the Msg-RNTI for the monitoring window. The wireless device may proceed to a backoff procedure for retransmission of the MsgA and/or fallback to four-step RACH, for example, if MsgA transmission fails.

DM-RS ports may be used for reception of downlink control channels. The DM-RS ports associated with a reception of the one or more downlink control channels may be quasi co-located with the DM-RS ports associated with the reception of the at least one downlink control signal. A spatial domain transmission filter used for sending (e.g., transmitting) the TB may be used for the reception of the at least one downlink control signal.

A wireless device may continue sending (e.g., transmitting) one or more additional repetitions of the TB. The wireless device may continue sending (e.g., transmitting) one or more additional repetitions of the TB after sending (e.g., transmitting) the K repetitions (e.g., the RSRP-based quantity/number of MsgA PUSCH repetitions), for example, based on not receiving an RAR. The wireless device may continue monitoring, for example, until an end of the monitoring window. The wireless device may continue monitoring, for example, until it detects an RAR (success-RAR and/or fallback-RAR) in the monitoring window.

The wireless device may start monitoring the one or more downlink control channels and the monitoring (e.g., RAR) window. The wireless device may start monitoring the one or more downlink control channels and the monitoring (e.g., RAR) window, based on a first TB transmission. The wireless device may start monitoring the one or more downlink control channels and the RAR window. The wireless device may start monitoring the one or more downlink control channels and the RAR window, based on sending (e.g., transmitting) the TB with a particular quantity/number of repetitions. The particular quantity/number of repetitions may be predefined or indicated by the base station via the configuration parameters (e.g., a cell-specific parameter). The base station may successfully receive and decode the TB prior to the particular quantity/number of repetitions from the wireless device. The base station may wait until the wireless device performs the transmission of the TB with the particular quantity/number of repetitions. The base station may send (e.g., transmit) an RAR based on a reception of the transmission of the TB with the particular quantity/number of repetitions (e.g., end of the last symbol of the transmission). The wireless device may be able to detect the RAR in the RAR window. The particular quantity/number of repetitions may be smaller than or equal to a quantity/number of repetitions determined by the wireless device based on RSRP (e.g., K in FIG. 22B). The particular quantity/number of repetitions may be smaller than or equal to R (e.g., total quantity/number of PUSCH occasions (POs) in the PO group).

A quantity/number of repetitions, K, may be mapped to a coverage enhancement level and/or RSRP. The wireless device may determine K repetitions based on one or more factors. The wireless device may determine K repetitions, for example, based on one or more of RSRP level or a capability (e.g., power, bandwidth, quantity of antennas, transmission power, etc.). The wireless device may start the monitoring window based on sending (e.g., transmitting) the K-th repetition, for example, after a quantity/number of symbols/slots/subframes from the last symbol of the PO corresponding to the K-th repetition. The wireless device may stop sending (e.g., transmitting) the TB, for example, after K repetitions. The wireless device may continue sending (e.g., transmitting) the TB, for example, after K repetitions and/or up to R repetitions. R may be the total quantity/number of transmission occasions (POs) in the PO group. The wireless device may continue sending (e.g., transmitting) the TB, for example, after K repetitions and/or until it detects one or more RARs in the monitoring window.

The base station may determine the RSRP-based quantity/number of repetitions (e.g., K). A wireless device may use K repetitions for TB transmission as part of the 2-step RACH procedure, based on the used resources (e.g., the preamble and/or the DM-RS port). The base station may configure, for example, a mapping between one or more preambles and each coverage enhancement level and/or PUSCH repetition factor. The base station may configure, for example, a mapping between one or more PUSCH DM-RS ports/sequences and each coverage enhancement level and/or PUSCH repetition factor. The base station may configure, for example, a mapping between one or more POs and/or ROs and each coverage enhancement level and/or PUSCH repetition factor. The base station may determine the value K, for example, if the base station receives a first preamble mapped to a first coverage enhancement level and/or PUSCH repetition factor. The base station may determine the value K, for example, if the base station receives a TB via a first DM-RS port/sequence mapped to a first coverage enhancement level and/or PUSCH repetition factor. The base station may determine the value K, for example, if the base station receives a preamble/TB via a first RO/PO mapped to a first coverage enhancement level and/or PUSCH repetition factor. The base station may determine the value K based on a peak of the received signal strength of the preamble/TB.

Figure 23:
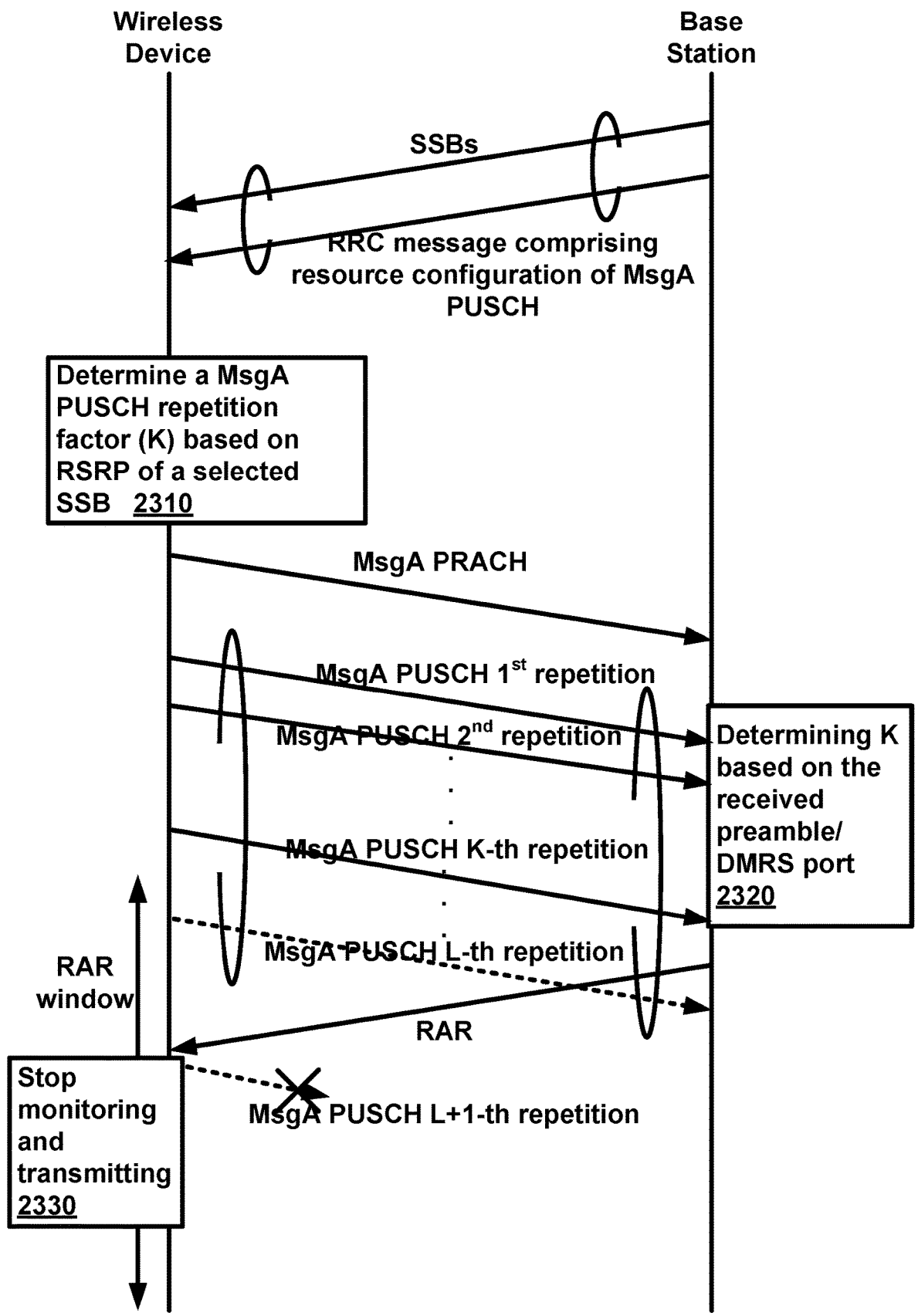
FIG. 23 shows an example of a random access procedure using a repetition.

FIG. 23 shows an example of a random access procedure using a repetition. Signaling is shown between a wireless device and a base station for a two-step RACH procedure (such as described above). The base station may send one or more messages to the wireless device. The one or more messages may comprise SSBs and/or RRC message(s) comprising resource configuration for a transmission (e.g., a MsgA PUSCH transmission). At step 2310, the wireless device may determine a MsgA PUSCH repetition factor, K, based on measurement of the RSRP of a selected SSB. The wireless device may send (e.g., transmit) MsgA PRACH followed by K transmission of MsgA PUSCH according to K repetitions. At step 2320, the base station may determine the value K based on the received preamble/DM-RS port of the received PRACH/PUSCH resources used for preamble/TB transmission. The wireless device may start the RAR window for monitoring for an RAR, for example, after or in response to the 1st repetition of the MsgA PUSCH. The wireless device may start the RAR window for monitoring for an RAR, for example, after or in response to the K-th repetition of the MsgA PUSCH (e.g., after an offset from the last symbol of the PO associated with the K-th repetitions). The base station, having determined the value K, may know if the wireless device starts the RAR window. The base station, based on successful reception of the MsgA PUSCH via one or more of the K repetitions, may send (e.g., transmit) an RAR comprising a success-RAR. The base station may not receive/decode the MsgA PUSCH successfully via the K repetitions. The base station may send (e.g., transmit) an RAR comprising a fallback-RAR and the wireless device may fallback to Msg3 transmission for sending (e.g., transmitting) the TB via one or more UL grants indicated in the fallback-RAR. The wireless device may continue sending (e.g., transmitting) MsgA PUSCH repetitions after the K-th repetition. the wireless device may continue sending (e.g., transmitting) MsgA PUSCH repetitions after the K-th repetition if the wireless device may not receive the RAR before K−1-th repetition (e.g., MsgA PUSCH L-th repetition in FIG. 23). At step 2330, the wireless device may stop sending (e.g., transmitting) the MsgA PUSCH repetitions, for example, after or in response to receiving an RAR (e.g., MsgA PUSCH L+1-th repetition is not performed in FIG. 23). At step 2330, the wireless device may stop monitoring PDCCH for an RAR based on receiving the RAR.

Figure 24:
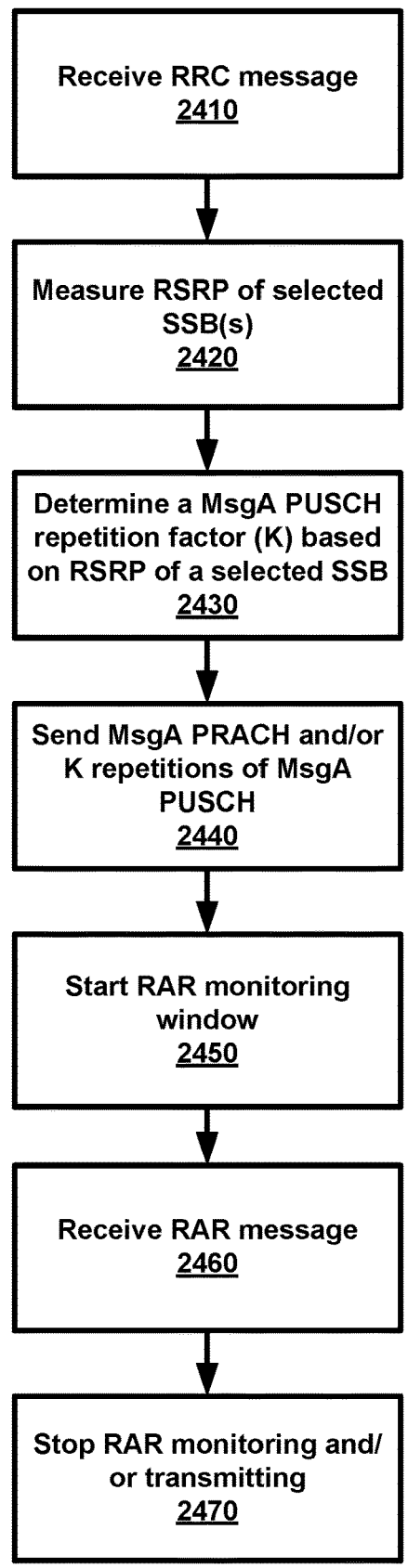
FIG. 24 shows an example of a random access procedure using a repetition.

FIG. 24 shows an example of a random access procedure using a repetition. The random access procedure may comprise a two-step RACH procedure. The random access procedure may be performed by a wireless device. A wireless device may receive an RRC message (e.g., via a PDCCH) at step 2410. The RRC message may comprise configuration parameters of PUSCH resources. The RRC message and one or more SSBs may be sent (e.g., transmitted) via a base station. The wireless device may determine the RSRP of the one or more SSBs at step 2420. The wireless device may select the SSB, for example, with the maximum measured RSRP. The wireless device may determine a MsgA PUSCH repetition factor (K) at step 2430. The wireless device may determine a MsgA PUSCH repetition factor (K), for example, based on measurement of the RSRP of the selected SSB at step 2430. K may be selected, for example, based on the RSRP range and/or RSRP threshold that may be mapped to K. For example, the wireless device may determine that the measured RSRP of the selected SSB is within a first range of RSRP that is mapped to K repetitions. Additionally or alternatively, the wireless device may determine that the measured RSRP of the selected SSB is higher or lower than a first RSRP threshold that may be mapped to K repetitions. The wireless device may send (e.g., transmit) MsgA PRACH followed by K transmission(s) of MsgA PUSCH according to K repetitions at step 2440. The wireless device may continue sending (e.g., transmitting) MsgA PUSCH repetitions after the K-th repetition. The wireless device may start the RAR window for monitoring for an RAR at step 2450. The wireless device may start the RAR window for monitoring the PDCCH for an RAR, for example, based on sending (e.g., transmitting) the K-th repetition of the MsgA PUSCH. The wireless device may start the RAR window for monitoring for an RAR, for example, based on sending (e.g., transmitting) the 1st repetition of the MsgA PUSCH. The wireless device may receive an RAR message at step 2460. The RAR message may comprise, for example, a success-RAR. The wireless device may stop the RAR monitoring window (e.g., monitoring PDCCH for an RAR) and/or may stop sending (e.g., transmitting) the MsgA PUSCH repetitions at step 2470. The wireless device may stop monitoring PDCCH for an RAR message and/or may stop sending (e.g., transmitting) the MsgA PUSCH repetitions, for example, based on receiving an RAR message.

Figure 25:
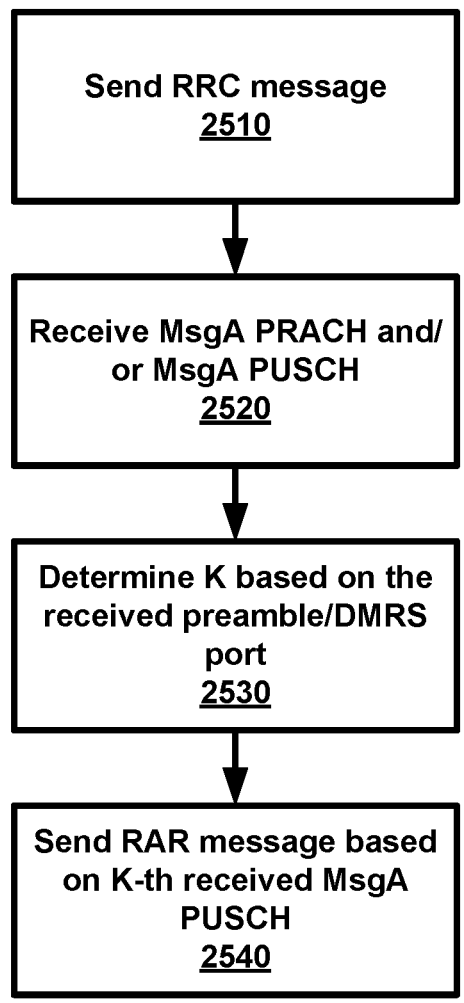
FIG. 25 shows an example of a random access procedure using a repetition.

FIG. 25 shows an example of a random access procedure using a repetition. FIG. 25 shows, for example, a two-step RACH procedure. The random access procedure may be performed by a base station. A base station may send an RRC message at step 2510. The RRC message may comprise configuration parameters of PUSCH resources. The RRC message may be sent via a PDCCH. The RRC message may be sent with one or more SSBs. The base station may receive one or more MsgA PRACH and/or PUSCH repetitions at step 2520. The one or more MsgA PRACH and/or PUSCH repetitions may include preamble and/or DM-RS port information. The base station may determine the value K at step 2530. The base station may determine the value K, for example, based on the received preamble and/or DM-RS port of the received PRACH/PUSCH resources. For example, one or more preambles and/or DM-RS ports may be mapped to different repetition factors. For example, the received preamble and/or DM-RS port may be mapped to the value K. The mapping between the preambles and/or DM-RS ports and the repetitions factors may be pre-defined and/or pre-configured by the base station. The base station may send (e.g., transmit) an RAR message at step 2540. The RAR message may comprise a success-RAR. The base station may send (e.g., transmit) an RAR message, for example, based on successful reception of the K-th repetition of MsgA PUSCH.

Figure 26:
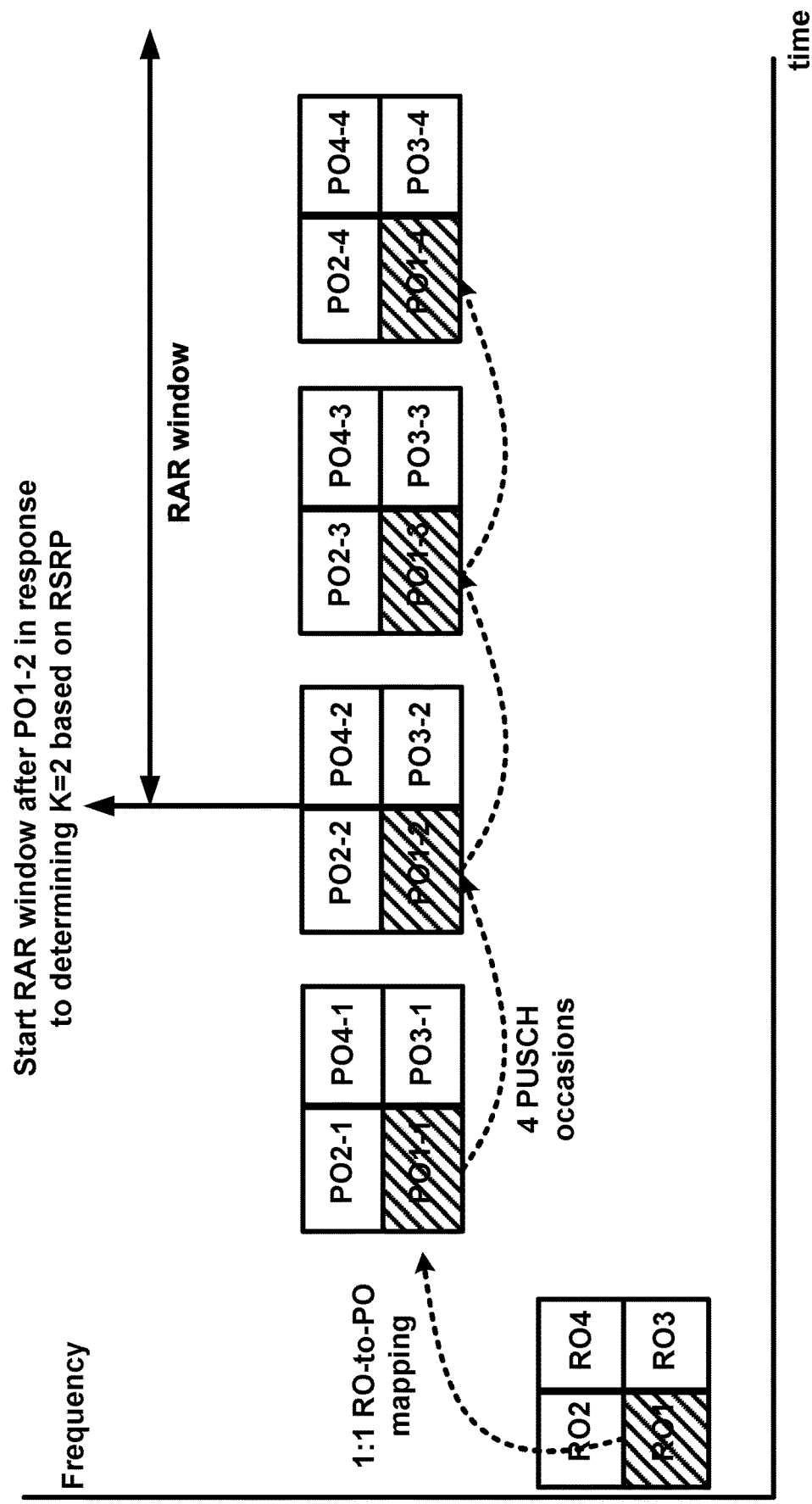
FIG. 26 shows an example of starting a random access response window based on a received signal strength for a message using a repetition.

FIG. 26 shows an example of starting a random access response window based on a received signal strength for a message using a repetition. FIG. 26 shows, for example, a wireless device that may be configured with resources for 2-step RACH MsgA transmission, such that ROs may be mapped to POs based on a 1-to-1 mapping (e.g., RO1 to PO1 or PO-group #1). Each PO group may be configured with R=4 POs for up to 4 repetitions of MsgA PUSCH transmission (e.g., PO1-1, PO1-2, PO1-3, and PO1-4, all mapped to RO1), for example, based on the resource configuration of the MsgA PUSCH from the base station. The wireless device may select an SSB (e.g., a downlink reference signal). The wireless device may determine a quantity/number of MsgA PUSCH repetitions based on the received signal strength (e.g., RSRP) of the SSB (e.g., a downlink reference signal), for example, K=2. The wireless device may start the RAR window based on the second transmission (e.g., with a configured/predefined offset from a last symbol of the PO corresponding to the 2nd (K-th) repetition of the MsgA PUSCH), for example, as shown in FIG. 26. The wireless device may send/continue sending (e.g., transmitting) MsgA PUSCH, for example, after the second repetition for up to 4 repetitions (or any other quantity of repetitions). The wireless device may continue sending (e.g., transmitting) MsgA PUSCH, for example, after the second repetition at least until the wireless device receives one or more RARs.

A wireless device may perform a method comprising multiple operations. The wireless device may receive configuration parameters of a plurality of physical uplink shared channel (PUSCH) resources for a random access preamble associated with a random access procedure. The wireless device may receive an indication of a first quantity of allowed repetitions of a message associated with the random access procedure. The wireless device may determine, based on a received signal strength of a downlink reference signal and based on the first quantity of allowed repetitions, a second quantity of repetitions of the message. The wireless device may determine one or more PUSCH resources, of the plurality of PUSCH resources, based on the second quantity of repetitions of the message (e.g., for transmission of the second quantity of repetitions of the message). The wireless device may transmit, via one or more PUSCH resources of the plurality of PUSCH resources, the second quantity of repetitions of the message. The wireless device may also perform one or more additional operations. The wireless device may determine a random access channel occasion associated with the downlink reference signal. The wireless device may transmit, via the random access channel occasion, the random access preamble. The wireless device may receive, in response to the message, a random access response, that indicates at least one of: a success of the random access procedure; a failure of the random access procedure; a fallback from a two-step random access procedure to a four-step random access procedure; or an uplink grant. The message may comprise at least one transport block. The random access preamble and the at least one transport block may be associated with a first message for the random access procedure. Each of the one or more PUSCH resources may comprise: at least one frequency resource; at least one time resource; and at least one demodulation reference signal (DM-RS) resource. The first quantity of allowed repetitions may be a maximum quantity of allowed repetitions. The determining the second quantity based on the first quantity of allowed repetitions may comprise determining the second quantity based on the second quantity being less than or equal to the first quantity. Based on not receiving at least one random access response within a time period, the wireless device may transmit the message via one or more second PUSCH resources of the plurality of PUSCH resources. The wireless device may select the downlink reference signal from a plurality of downlink reference signals based on the received signal strength of the downlink reference signal. Selecting the downlink reference signal may be based on the received signal strength of the downlink reference signal being greater than a threshold value. The wireless device may select the random access preamble. The wireless device may select a random access channel occasion associated with the downlink reference signal, wherein the random access channel occasion is valid. The wireless device may map the plurality of PUSCH resources to the random access preamble. The plurality of PUSCH resources may comprise at least a first quantity of PUSCH resources for the first quantity of allowed repetitions for at least one transport block. The one or more PUSCH resources may be valid. The wireless device may monitor, in response to the transmitting, one or more downlink control channels for at least one random access response. The wireless device may receive one or more radio resource control (RRC) messages that may comprise configuration parameters indicating: one or more downlink control channels; and a duration of a monitoring window. The wireless device may transmit at least one transport block using one or more uplink grants. The wireless device may stop monitoring one or more downlink control channels for at least one random access response in response to receiving the at least one random access response. The wireless device may transmit at least one transport block via one or more second PUSCH resources of the plurality of PUSCH resources, in response to not receiving at least one random access response during a duration of a monitoring window. A spatial domain transmission filter used for transmitting at least one transport block may be used for a reception of the downlink reference signal. The wireless device may start monitoring, in response to transmitting at least one transport block with a third quantity of repetitions, one or more downlink control channels for at least one random access response. A third quantity of repetitions may be smaller than or equal to the first quantity of allowed repetitions. A third quantity of repetitions may be pre-defined. One or more radio resource control (RRC) messages may further indicate a third quantity of repetitions. One or more radio resource control (RRC) messages may further indicate one or more signal strength thresholds. One or more radio resource control (RRC) messages may further indicate one or more quantities of repetitions for at least one transport block, wherein each quantity is mapped to a signal strength threshold. Systems, devices, and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the downlink reference signal. A computer-readable medium may store instructions that, when executed, cause performance of the described method, additional operations and/or include the additional elements.

A base station may perform a method comprising multiple operations. The base station may transmit configuration parameters of a plurality of physical uplink shared channel (PUSCH) resources for a random access preamble associated with a random access procedure. The base station may transmit an indication of a first quantity of allowed repetitions of a message associated with the random access procedure. The base station may transmit a downlink reference signal for a determination of a second quantity of repetitions of the message. The second quantity may be less than or equal to the first quantity. The base station may receive, via one or more PUSCH resources of the plurality of PUSCH resources, at least one of the second quantity of repetitions of the message. The base station may transmit, based on the receiving the at least one of the second quantity of repetitions of the message, a random access response. The base station may also perform one or more additional operations. The base station may receive, via a physical random access channel (PRACH), the random access preamble. The transmitting the random access response may further based on the receiving the random access preamble. The random access response may indicate at least one of: a success of the random access procedure; a failure of the random access procedure; a fallback from a two-step random access procedure to a four-step random access procedure; or an uplink grant. The message may comprise at least one transport block. The random access preamble and the at least one transport block may be associated with a first message for the random access procedure. Each of the one or more PUSCH resources may comprise: at least one frequency resource; at least one time resource; and at least one demodulation reference signal (DM-RS) resource. The first quantity of allowed repetitions may be a maximum quantity of allowed repetitions. Systems, devices, and media may be configured with the method. A base station may comprise one or more processors; and memory storing instructions that, when executed, cause the base station to perform the described method, additional operations and/or include the additional elements. A system may comprise a base station configured to perform the described method, additional operations and/or include the additional elements; and a wireless device configured to send the second quantity of repetitions of the message. A computer-readable medium may store instructions that, when executed, cause performance of the described method, additional operations and/or include the additional elements.

A wireless device may perform a method comprising multiple operations. The wireless device may receive configuration parameters of a plurality of physical uplink shared channel (PUSCH) resources for repetitions of a message associated with a random access procedure. The wireless device may determine, based on a received signal strength of a downlink reference signal, a quantity of repetitions of the message. The wireless device may determine one or more PUSCH resources, of the plurality of PUSCH resources, based on the second quantity of repetitions of the message (e.g., for transmission of the second quantity of repetitions of the message). The wireless device may transmit, via a physical random access channel (PRACH), a random access preamble associated with the random access procedure. The wireless device may transmit, via one or more PUSCH resources of the plurality of PUSCH resources, the quantity of repetitions of the message. The wireless device may also perform one or more additional operations. The wireless device may receive an indication of a quantity of allowed repetitions of a transport block for the random access procedure. The determining the quantity of repetitions of the message may be further based on the quantity of allowed repetitions. The wireless device may determine a random access channel occasion on the PRACH and associated with the downlink reference signal. The transmitting the random access preamble may comprise transmitting the random access preamble via the random access channel occasion. The wireless device may receive, in response to the message, a random access response that indicates at least one of: a success of the random access procedure; a failure of the random access procedure; a fallback from a two-step random access procedure to a four-step random access procedure; or an uplink grant. The message may comprise at least one transport block. The random access preamble and the at least one transport block may be associated with a first message for the random access procedure. Each of the one or more PUSCH resources may comprise: at least one frequency resource; at least one time resource; and at least one demodulation reference signal (DM-RS) resource. The determining the quantity of repetitions of the message may be further based on the quantity being less than or equal to a maximum allowable quantity of repetitions of the message. Based on not receiving at least one random access response within a time period, the wireless device may transmit the message via one or more second PUSCH resources of the plurality of PUSCH resources. Systems, devices, and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the downlink reference signal. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
receiving, by a wireless device:
configuration parameters of a plurality of physical uplink shared channel (PUSCH) resources for a random access preamble associated with a random access procedure; and
an indication of a first quantity of allowed repetitions of a PUSCH transmission comprising at least one transport block, wherein the random access preamble and the at least one transport block are associated with the random access procedure;
determining, based on a received signal strength of a downlink reference signal and based on the first quantity of allowed repetitions, a second quantity of repetitions of the PUSCH transmission; and
transmitting, via one or more PUSCH resources of the plurality of PUSCH resources, the second quantity of repetitions of the PUSCH transmission.

2. The method of claim 1, further comprising:
determining a random access channel occasion associated with the downlink reference signal; and
transmitting, via the random access channel occasion, the random access preamble.

3. The method of claim 1, further comprising:
receiving, in response to the PUSCH transmission, a random access response that indicates at least one of:
a success of the random access procedure;
a failure of the random access procedure;
a fallback from a two-step random access procedure to a four-step random access procedure; or
an uplink grant.

4. The method of claim 1, wherein each of the one or more PUSCH resources comprises:
at least one frequency resource;
at least one time resource; and
at least one demodulation reference signal (DM-RS) resource.

5. The method of claim 1, wherein:
the first quantity of allowed repetitions is a maximum quantity of allowed repetitions; and
the determining the second quantity based on the first quantity of allowed repetitions comprises determining the second quantity based on the second quantity being less than or equal to the first quantity.

6. The method of claim 1, further comprising:
based on not receiving at least one random access response within a time period, transmitting the PUSCH transmission via one or more second PUSCH resources of the plurality of PUSCH resources.

7. A method comprising:
transmitting, by a base station:
configuration parameters of a plurality of physical uplink shared channel (PUSCH) resources for a random access preamble associated with a random access procedure; and
an indication of a first quantity of allowed repetitions of a PUSCH transmission comprising at least one transport block, wherein the random access preamble and the at least one transport block are associated with the random access procedure;
transmitting a downlink reference signal for a determination of a second quantity of repetitions of the PUSCH transmission;
receiving, via one or more PUSCH resources of the plurality of PUSCH resources, at least one of the second quantity of repetitions of the PUSCH transmission; and
transmitting, based on the receiving the at least one of the second quantity of repetitions of the PUSCH transmission, a random access response.

8. The method of claim 7, further comprising:
receiving, via a physical random access channel (PRACH), the random access preamble, wherein the transmitting the random access response is further based on the receiving the random access preamble, and wherein the random access response indicates at least one of:
a success of the random access procedure;
a failure of the random access procedure;
a fallback from a two-step random access procedure to a four-step random access procedure; or
an uplink grant.

9. The method of claim 7, wherein each of the one or more PUSCH resources comprises:
at least one frequency resource;
at least one time resource; and
at least one demodulation reference signal (DM-RS) resource.

10. The method of claim 7, wherein:
the first quantity of allowed repetitions is a maximum quantity of allowed repetitions; and
the second quantity is less than or equal to the first quantity.

11. A method comprising:
receiving, by a wireless device, configuration parameters of a plurality of physical uplink shared channel (PUSCH) resources for repetitions of a PUSCH transmission comprising at least one transport block associated with a random access procedure;
determining, based on a received signal strength of a downlink reference signal, a quantity of repetitions of the PUSCH transmission;
transmitting, via a physical random access channel (PRACH), a random access preamble associated with the random access procedure; and
transmitting, via one or more PUSCH resources of the plurality of PUSCH resources, the quantity of repetitions of the PUSCH transmission.

12. The method of claim 11, further comprising:
receiving an indication of a quantity of allowed repetitions of a transport block for the random access procedure, and wherein the determining the quantity of repetitions of the PUSCH transmission is further based on the quantity of allowed repetitions.

13. The method of claim 11, further comprising:
determining a random access channel occasion on the PRACH and associated with the downlink reference signal, and wherein the transmitting the random access preamble comprises transmitting the random access preamble via the random access channel occasion.

14. The method of claim 11, further comprising:
receiving, in response to the PUSCH transmission, a random access response that indicates at least one of:
a success of the random access procedure;
a failure of the random access procedure;
a fallback from a two-step random access procedure to a four-step random access procedure; or
an uplink grant.

15. The method of claim 11, wherein each of the one or more PUSCH resources comprises:
- at least one frequency resource;
- at least one time resource; and
- at least one demodulation reference signal (DM-RS) resource.

16. The method of claim 11, wherein the determining the quantity of repetitions of the PUSCH transmission is further based on the quantity being less than or equal to a maximum allowable quantity of repetitions of the PUSCH transmission.

17. The method of claim 11, further comprising:
- based on not receiving at least one random access response within a time period, transmitting the PUSCH transmission via one or more second PUSCH resources of the plurality of PUSCH resources.

* * * * *

UNITED STATES PATENT AND TRADEMARK OFFICE
CERTIFICATE OF CORRECTION

| | | |
|---|---|---|
| PATENT NO. | : 11,483,859 B2 | Page 1 of 1 |
| APPLICATION NO. | : 16/993546 | |
| DATED | : October 25, 2022 | |
| INVENTOR(S) | : Rastegardoost et al. | |

It is certified that error appears in the above-identified patent and that said Letters Patent is hereby corrected as shown below:

In the Specification

Column 11, Detailed Description, Line 65:
Delete "MAC" and insert --RLC-- therefor Column 13, Detailed Description, Line 26:
After "commands", insert --.-- therefor Column 46, Detailed Description, Line 59:
After "running", insert --.-- therefor Column 54, Detailed Description, Line 7:
After "performance", insert --.-- therefor Column 55, Detailed Description, Line 26:
Delete "3 A" and insert --3A-- therefor Column 62, Detailed Description, Line 7:
After "SIB.", insert --.-- therefor Column 67, Detailed Description, Line 13:
After "avoided", insert --.-- therefor Column 79, Detailed Description, Line 58:
Delete "Lab VIEWMathScript." and insert --LabVIEWMathScript.-- therefor Column 80, Detailed Description, Lines 62-63:
After "manner", insert --.-- therefor Signed and Sealed this
Second Day of July, 2024

Katherine Kelly Vidal
*Director of the United States Patent and Trademark Office*